(12) United States Patent
Nurishi

(10) Patent No.: US 7,903,345 B2
(45) Date of Patent: Mar. 8, 2011

(54) ZOOM LENS AND IMAGE PICKUP APPARATUS HAVING THE SAME

(75) Inventor: Ryuji Nurishi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/574,360

(22) Filed: Oct. 6, 2009

(65) Prior Publication Data

US 2010/0085647 A1  Apr. 8, 2010

(30) Foreign Application Priority Data

Oct. 8, 2008 (JP) .................................. 2008-261593

(51) Int. Cl.
*G02B 15/14* (2006.01)
(52) U.S. Cl. ........................................ 359/687; 359/676
(58) Field of Classification Search .................. 359/676, 359/684, 686, 687
See application file for complete search history.

(56) References Cited

U.S. PATENT DOCUMENTS

| | | |
|---|---|---|
| 2,698,555 A | 1/1955 | McCarthy |
| 3,868,174 A | 2/1975 | Yakota |
| 4,439,017 A | 3/1984 | Yamaguchi |
| 6,404,561 B1 | 6/2002 | Isono |
| 6,594,087 B2 | 7/2003 | Uzawa |
| 6,940,656 B2 | 9/2005 | Oomura et al. |
| 7,505,213 B2 | 3/2009 | Tsutsumi |
| 2004/0169934 A1 | 9/2004 | Oomura |

FOREIGN PATENT DOCUMENTS

| | | |
|---|---|---|
| JP | 2001-194590 A | 7/2001 |
| JP | 2002-062478 A | 2/2002 |
| JP | 2004-264458 A | 9/2004 |
| JP | 2004-264459 A | 9/2004 |
| JP | 2008-40395 A | 2/2008 |

OTHER PUBLICATIONS

Warren J. Smith, "Modern Optical Engineering: The Design of Optical Systems", 1966, McGraw-Hill, XP002564589.
R.S. Longhurst: "Geometrical and Physical Optics", 1963, Longmans, XP002564590.

*Primary Examiner* — Darryl J Collins
(74) *Attorney, Agent, or Firm* — Canon U.S.A., Inc., IP Division

(57) ABSTRACT

A zoom lens includes, in order from an object side to an image side, a first lens unit having a positive refractive power, a second lens unit having a negative refractive power and configured to move during zooming, a third lens unit having a positive refractive power and configured to move during zooming, and a fourth lens unit having a positive refractive power and configured not to move for zooming. In the zoom lens, the second lens unit includes at least one positive lens and at least one negative lens. Furthermore, in the zoom lens, average values of Abbe number ($\nu$) and relative partial dispersion ($\theta$) of materials of the at least one negative lens ($\nu na$, $\theta na$) and average values of Abbe number ($\nu$) and relative partial dispersion ($\theta$) of materials of the at least one positive lens ($\nu pa$, $\theta pa$) satisfy an appropriate condition.

9 Claims, 25 Drawing Sheets

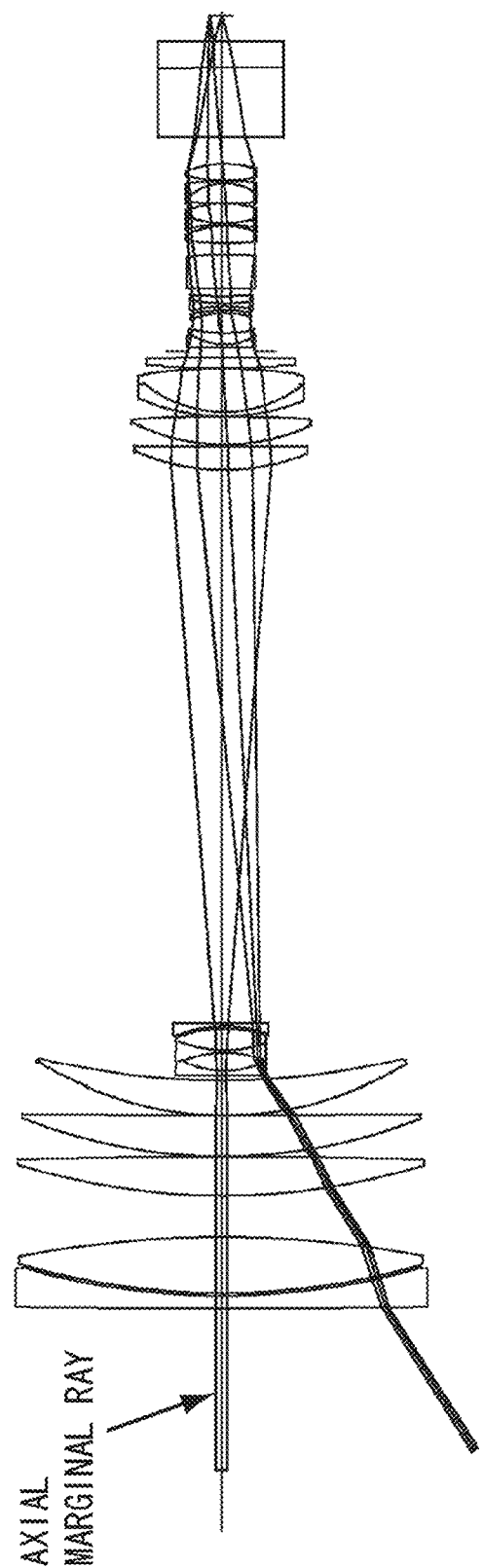

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same. More particularly, the present invention relates to a zoom lens useful in a broadcast television camera, a video camera, a digital still camera, and a silver-halide film camera.

2. Description of the Related Art

In recent years, it has become desirable for photographic optical systems (zoom lens) used in an image pickup apparatus, such as a television camera, a silver-halide film camera, a digital camera, or a video camera, to include a zoom lens with a high F-number value, a high zoom ratio, and a high optical performance. In order to achieve a high F-number value and a high zoom ratio, a conventional zoom lens system includes a four-unit zoom lens including, in order from the object side to the image side, a first lens unit having a positive refractive power, a second lens unit having a negative refractive power, a third lens unit having a positive refractive power, and a fourth lens unit having a positive refractive power.

U.S. Pat. No. 6,940,656, Japanese Patent Application Laid-Open No. 2004-264459, and U.S. Pat. No. 7,505,213 discuss a four-unit zoom lens, as described above, having a high zoom ratio of about 96 or 50. In addition, U.S. Pat. Nos. 6,404,561 and 6,594,087 discuss a four-unit zoom lens with chromatic aberration corrected by using a lens made of a material having anomalous dispersion.

However, if the zoom ratio becomes as high as about 100, a large amount of variation of various aberrations may occur. Accordingly, in this case, it becomes difficult to achieve a high optical performance over the entire zoom range.

In particular, a large amount of chromatic aberration of magnification (lateral chromatic aberration) and axial chromatic aberration (longitudinal chromatic aberration) may occur at the zoom position close to the telephoto end. Therefore, it is important to effectively correct aberrations in the secondary spectrum as well as those in the primary spectrum to form a high quality image.

In a positive-lead type four-unit zoom lens, in order to achieve a high zoom ratio of about 100, to effectively correct chromatic aberration, and to achieve a high optical performance, it is important to appropriately set the configuration of lenses of a second lens unit, which primarily performs variable magnification.

If the lens configuration of the second lens unit is not appropriately set, a large amount of variation of aberrations, such as chromatic aberration, spherical aberration, flare, coma, and color difference of spherical aberration, may occur during zooming. It therefore becomes difficult to achieve both a zoom lens having a high zoom ratio and a high optical performance at the same time.

In particular, axial chromatic aberration may increase at the telephoto end. In addition, residual aberration in the secondary spectrum may occur in too large an amount to effectively correct.

SUMMARY OF THE INVENTION

According to an aspect of the present invention, a zoom lens includes, in order from an object side to an image side, a first lens unit having a positive refractive power, a second lens unit having a negative refractive power and configured to move during zooming, a third lens unit having a positive refractive power and configured to move during zooming, and a fourth lens unit having a positive refractive power and configured not to move for zooming. In the zoom lens, the second lens unit includes at least one positive lens and at least one negative lens. Furthermore, in the zoom lens, average values of Abbe number (ν) and relative partial dispersion (θ) of materials of the at least one negative lens (νna, θna) and average values of Abbe number (ν) and relative partial dispersion (θ) of materials of the at least one positive lens (νpa, θpa) satisfy the following condition:

$$(\theta pa - \theta na)/(\nu pa - \nu na) < -3.7 \times 10^{-3}.$$

Further features and aspects of the present invention will become apparent from the following detailed description of exemplary embodiments with reference to the attached drawings.

BRIEF DESCRIPTION OF THE DRAWINGS

The accompanying drawings illustrate exemplary embodiments, features, and aspects of the invention and, together with the description, serve to explain the principles of the present invention.

FIGS. 24A and 24B illustrate an optical path of example 1.

DESCRIPTION OF THE EMBODIMENTS

Figure 1:
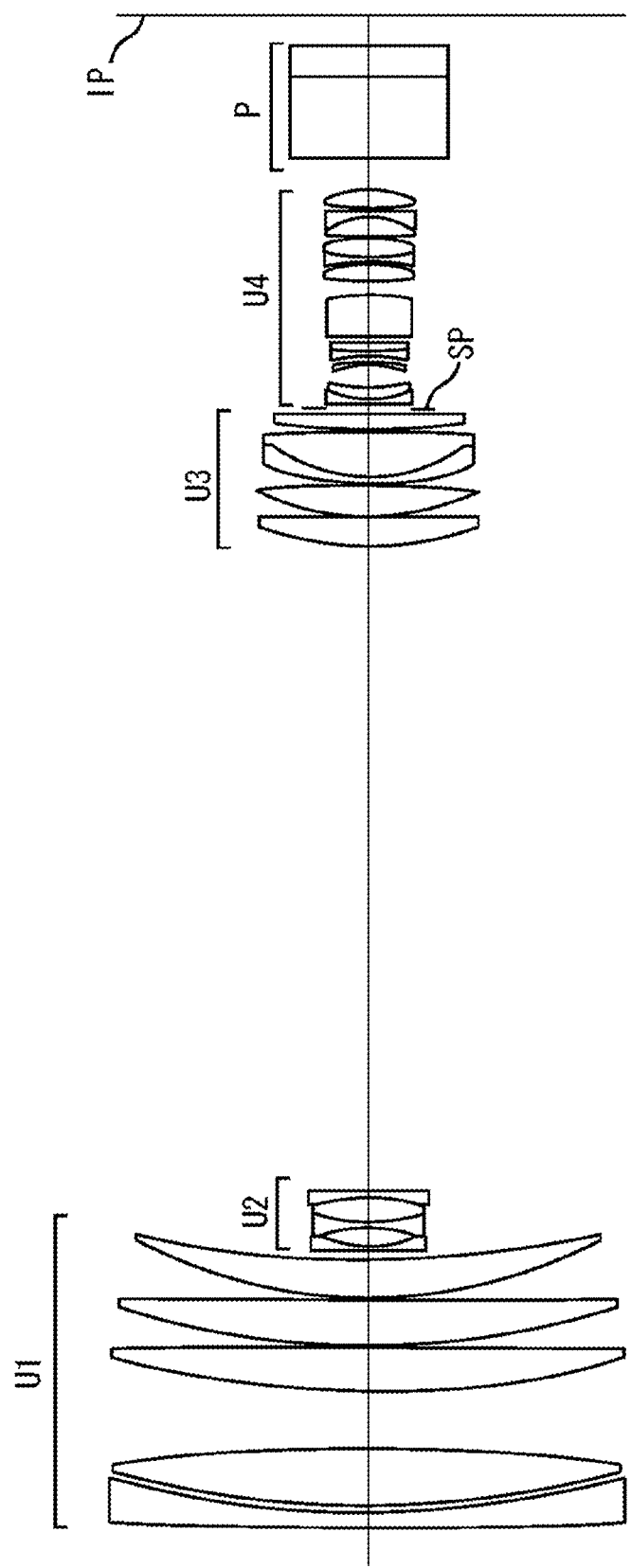
FIG. 1 is a lens cross section at the wide-angle end according to example 1 of the present invention.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

Processes, techniques, apparatus, and materials as known by one of ordinary skill in the relevant art may not be discussed in detail but are intended to be part of the enabling description where appropriate, for example the fabrication of the lens elements and their materials.

Notice that similar reference numerals and letters refer to similar items in the following figures, and thus once an item is defined in one figure, it may not be discussed for following figures.

Note that herein when referring to correcting or corrections of an error (e.g., aberration), a reduction of the error and/or a correction of the error is intended.

A zoom lens according to an exemplary embodiment of the present invention includes, in order from the object side to the image side, a first lens unit having a positive refractive power, a second lens unit having a negative refractive power, a third lens unit having a positive refractive power, and a fourth lens unit having a positive refractive power.

Each exemplary embodiment of the present invention is directed to a zoom lens having a high zoom ratio and capable of effectively reducing and correcting chromatic aberration in the entire zoom range from the wide-angle end to the telephoto end. More specifically, each exemplary embodiment of the present invention is directed to a zoom lens having a high optical performance in the entire zoom range and an image pickup apparatus having the zoom lens.

In the following description, an exemplary embodiment of the present invention, namely, a zoom lens and an image pickup apparatus having the zoom lens, will be described in detail.

The zoom lens according to each exemplary embodiment of the present invention includes the following lens units in order from the object side to the image side.

A first lens unit (focusing lens unit) U1, which is located at a position closest to the object side, has a positive refractive power and is configured to move during focusing (for focusing). A second lens unit (variator (variable-magnification lens unit)) U2, which is located at a position second closest to the object side, has a negative refractive power and is configured to move towards the image side during zooming from the wide-angle end (short focal length end) to the telephoto end (long focal length end).

A third lens unit U3, which is located at a position third closest to the object side, has a positive refractive power and is configured to move along the optical axis during zooming (to nonlinearly move to compensate for the variation of an image plane caused by zooming). A fourth lens unit U4, which is located at a position most distant from the object side among the four lens units, has a positive refractive power and is configured to remain stationary during zooming (to remain stationary for zooming, not to move for zooming). The second lens unit U2 and the third lens unit U3 constitute a variable magnification system.

FIG. 1 is a lens cross section of the zoom lens according to a first exemplary embodiment (example 1) of the present invention at the wide-angle end during focusing on an infinitely-distant object.

Figure 2:
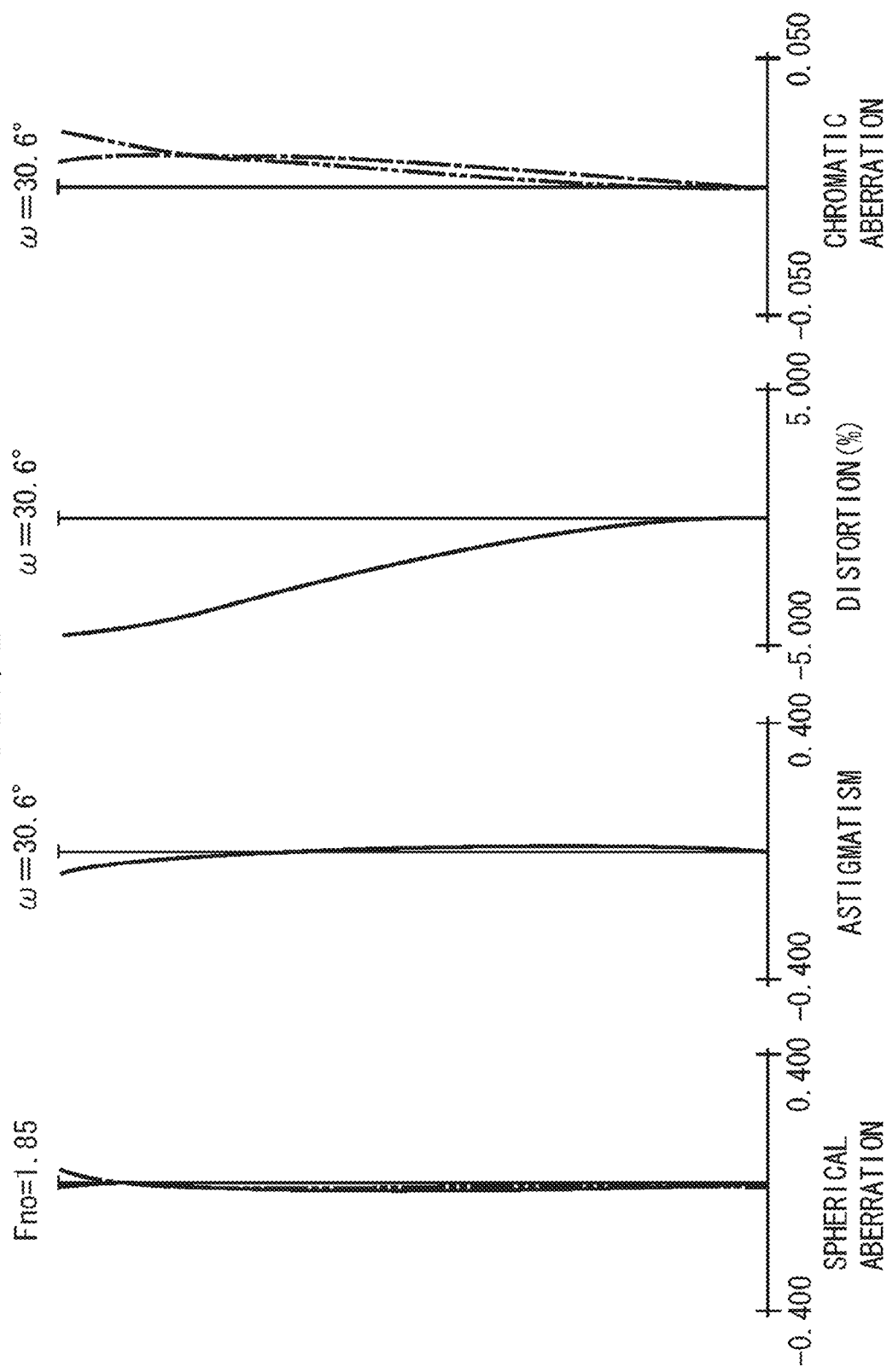
FIG. 2 is an aberration chart of example 1 of the present invention where f=9.3 mm.
Figure 3:
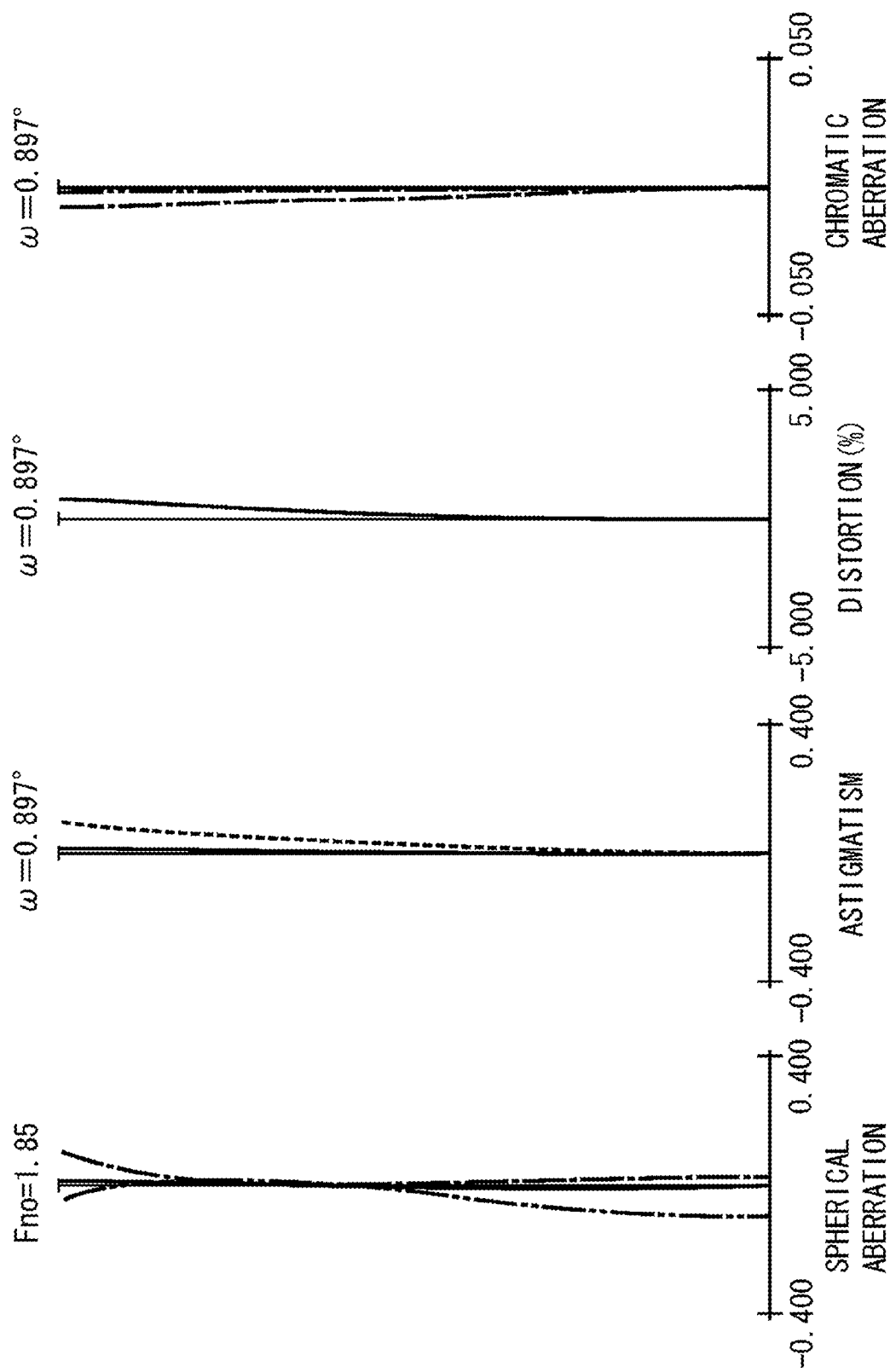
FIG. 3 is an aberration chart of example 1 of the present invention where f=357 mm.
Figure 4:
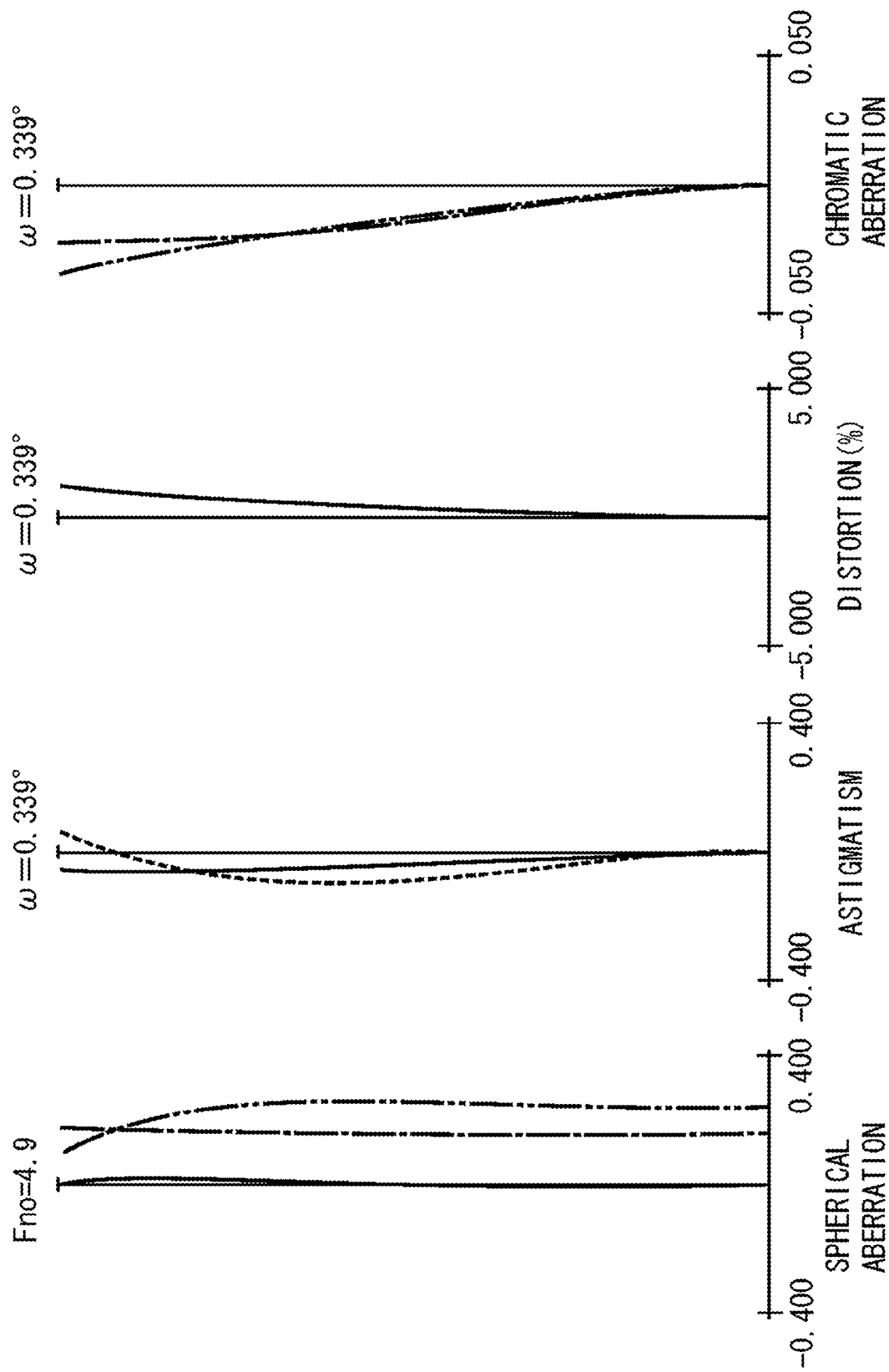
FIG. 4 is an aberration chart of example 1 of the present invention where f=930 mm.

FIGS. 2 through 4 are vertical aberration charts according to example 1 at the wide-angle end, at the focal length of 357 mm, and at the telephoto end, respectively. The value of the focal length is a value of the corresponding example indicated in the unit of millimeter. The same applies to the other exemplary embodiments of the present invention. The examples will be described in detail below.

Figure 5:
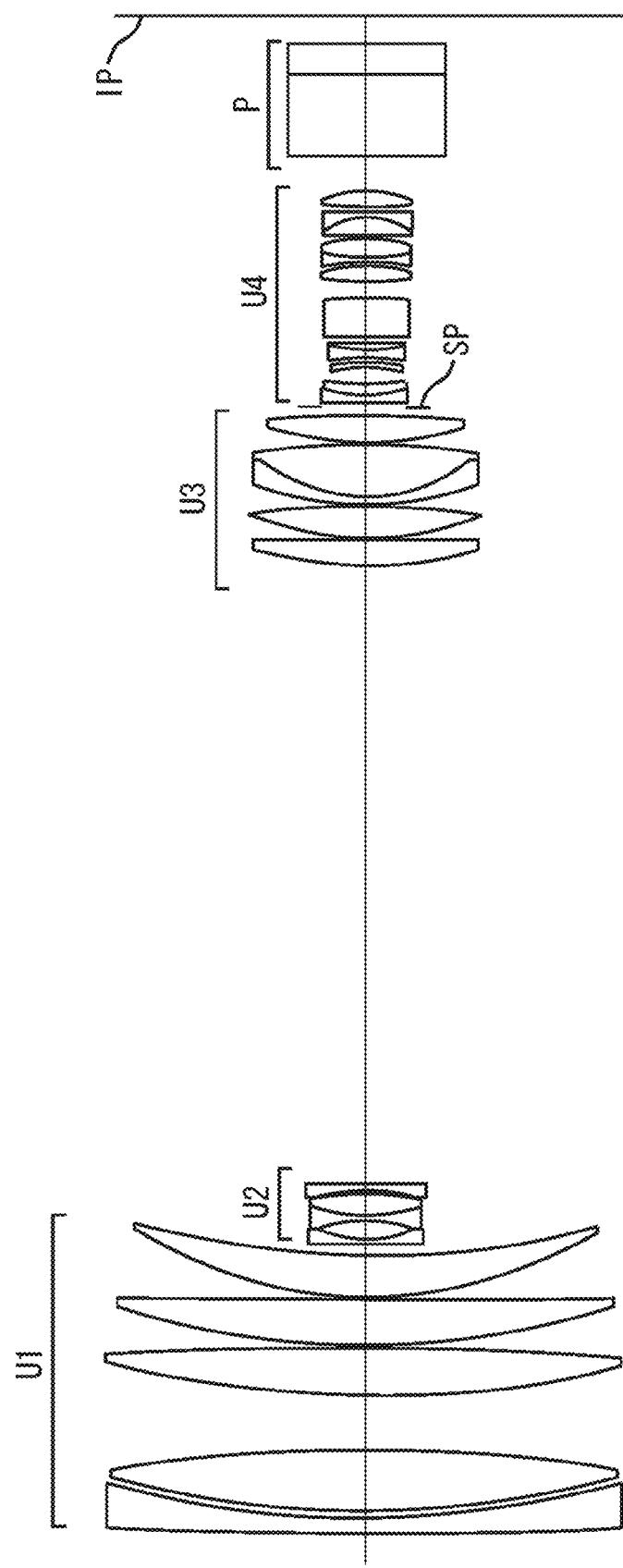
FIG. 5 is a lens cross section at the wide-angle end according to example 2 of the present invention.

FIG. 5 is a lens cross section of the zoom lens according to a second exemplary embodiment (example 2) of the present invention at the wide-angle end during focusing on an infinitely-distant object.

Figure 6:
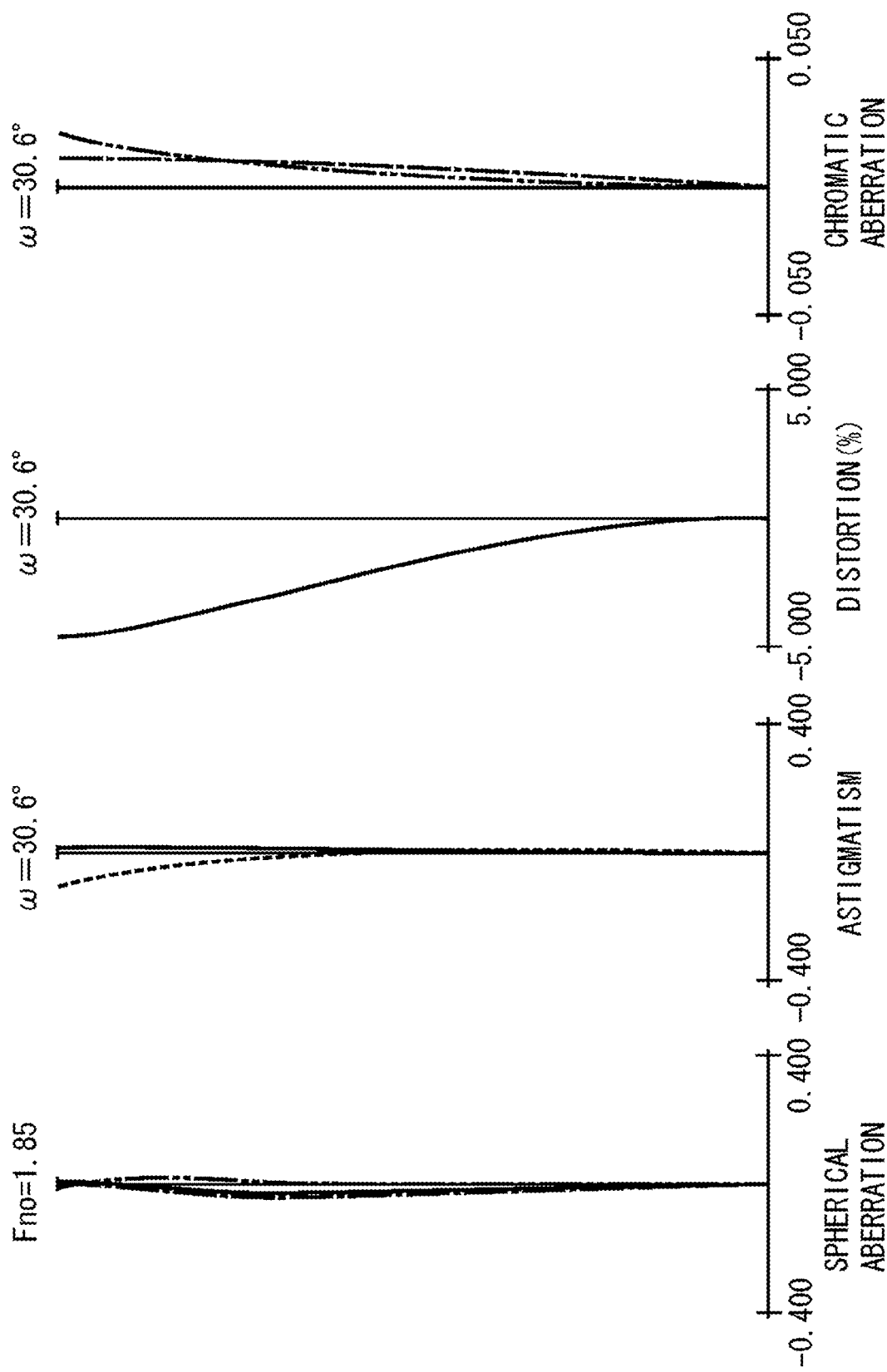
FIG. 6 is an aberration chart of example 2 of the present invention where f=9.3 mm.
Figure 7:
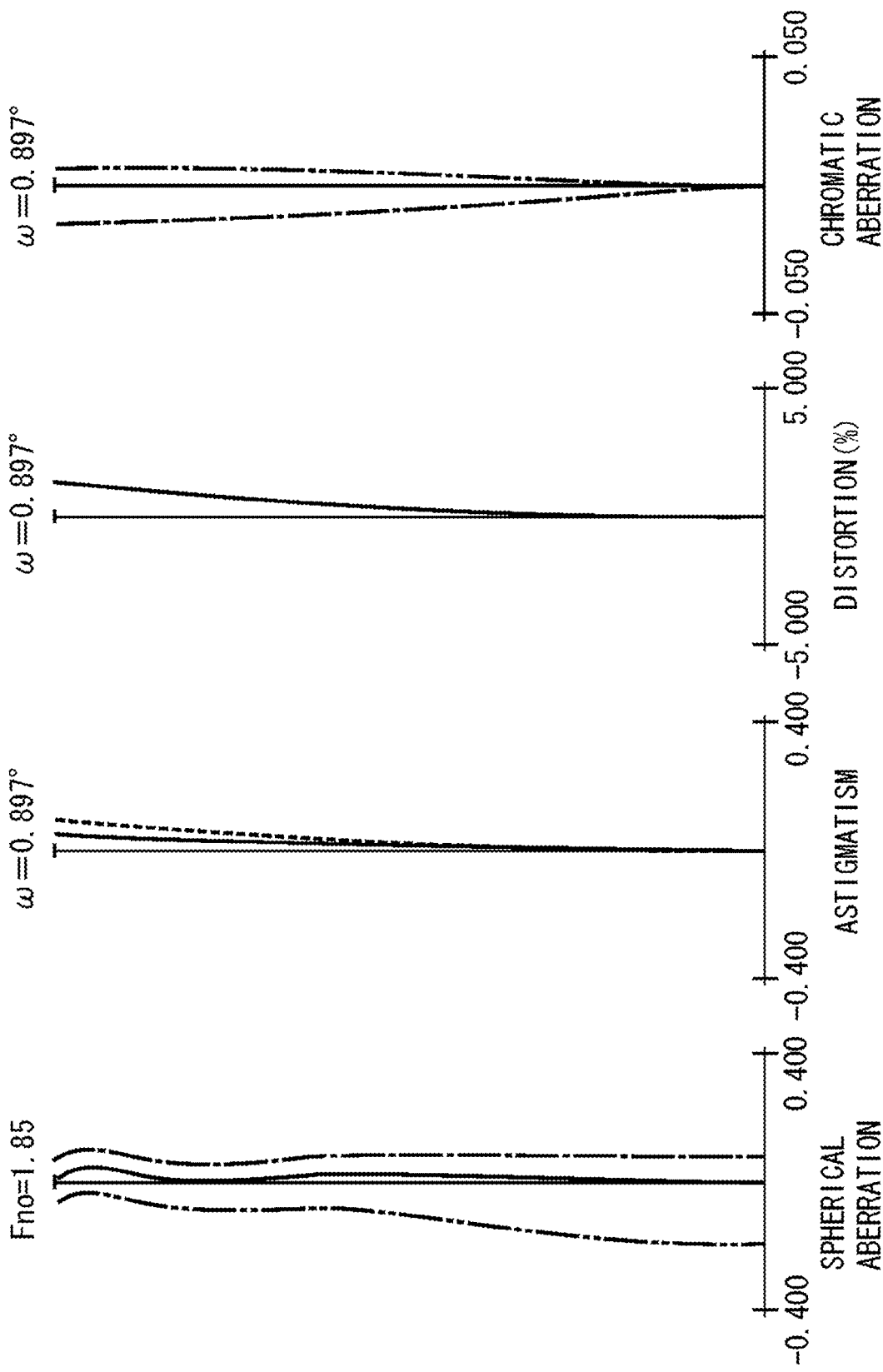
FIG. 7 is an aberration chart of example 2 of the present invention where f=357 mm.
Figure 8:
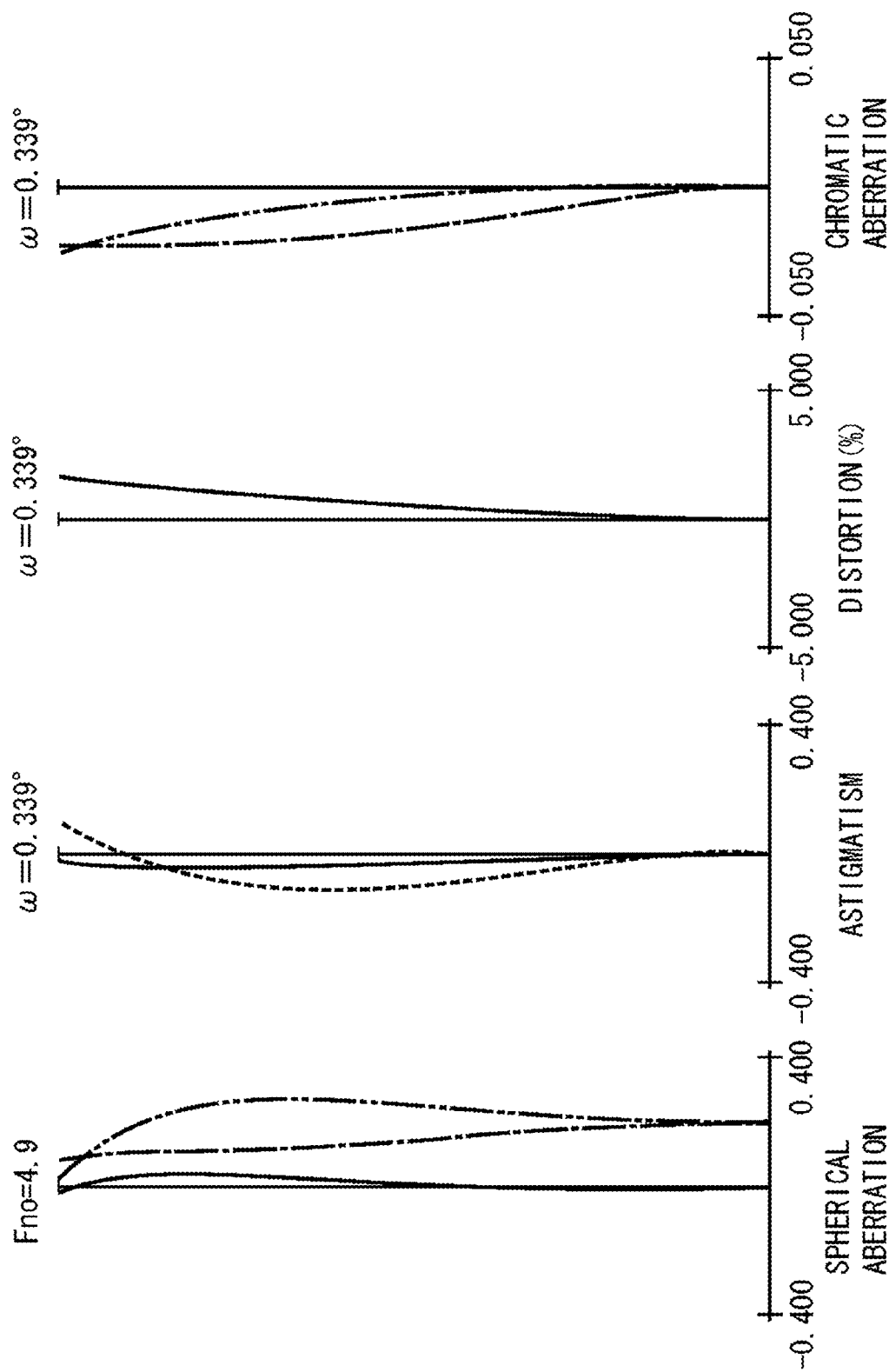
FIG. 8 is an aberration chart of example 2 of the present invention where f=930 mm.

FIGS. 6 through 8 are vertical aberration charts according to example 2 at the wide-angle end, at the focal length of 357 mm, and at the telephoto end, respectively.

Figure 9:
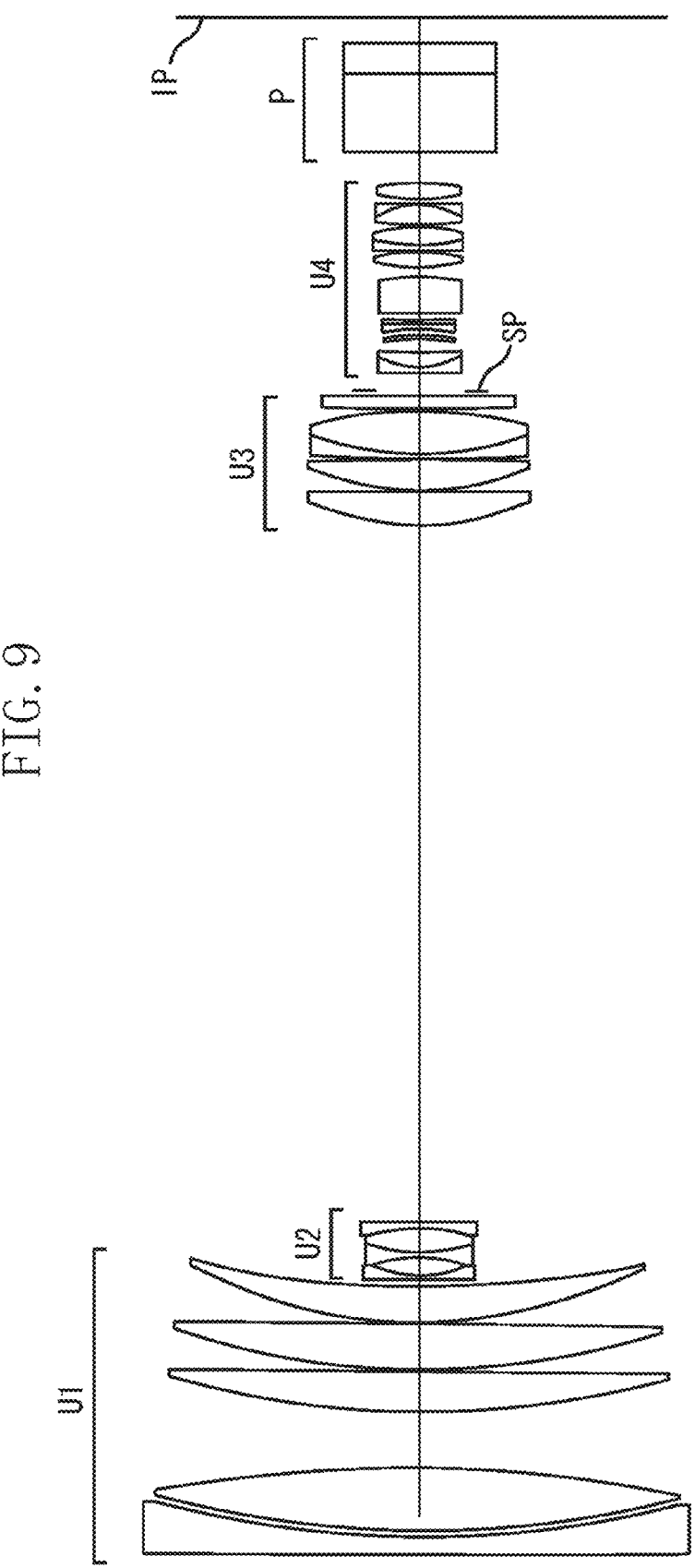
FIG. 9 is a lens cross section at the wide-angle end according to example 3 of the present invention.

FIG. 9 is a lens cross section of the zoom lens according to a third exemplary embodiment (example 3) of the present invention at the wide-angle end during focusing on an infinitely-distant object.

Figure 10:
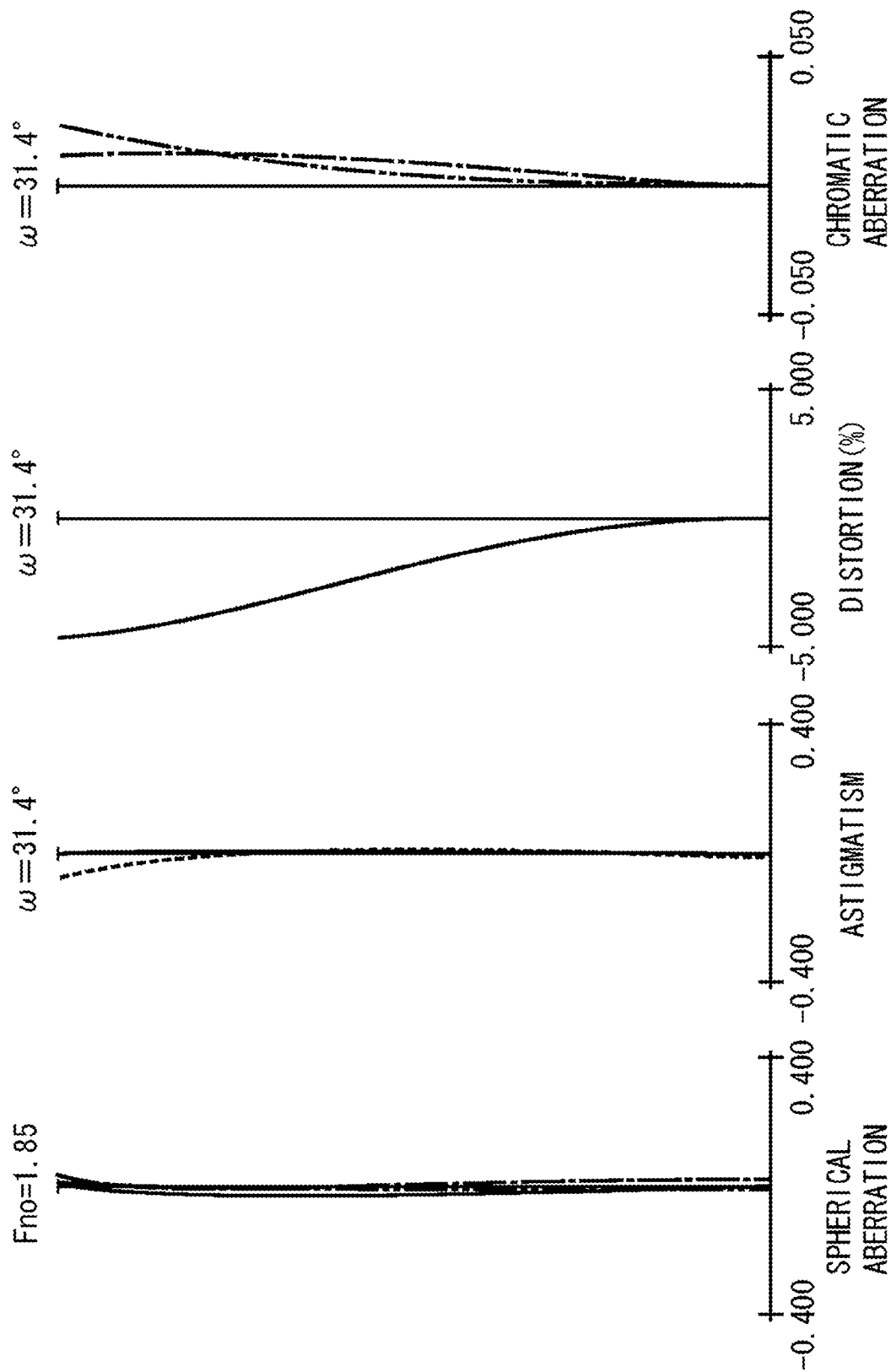
FIG. 10 is an aberration chart of example 3 of the present invention where f=9 mm.
Figure 11:
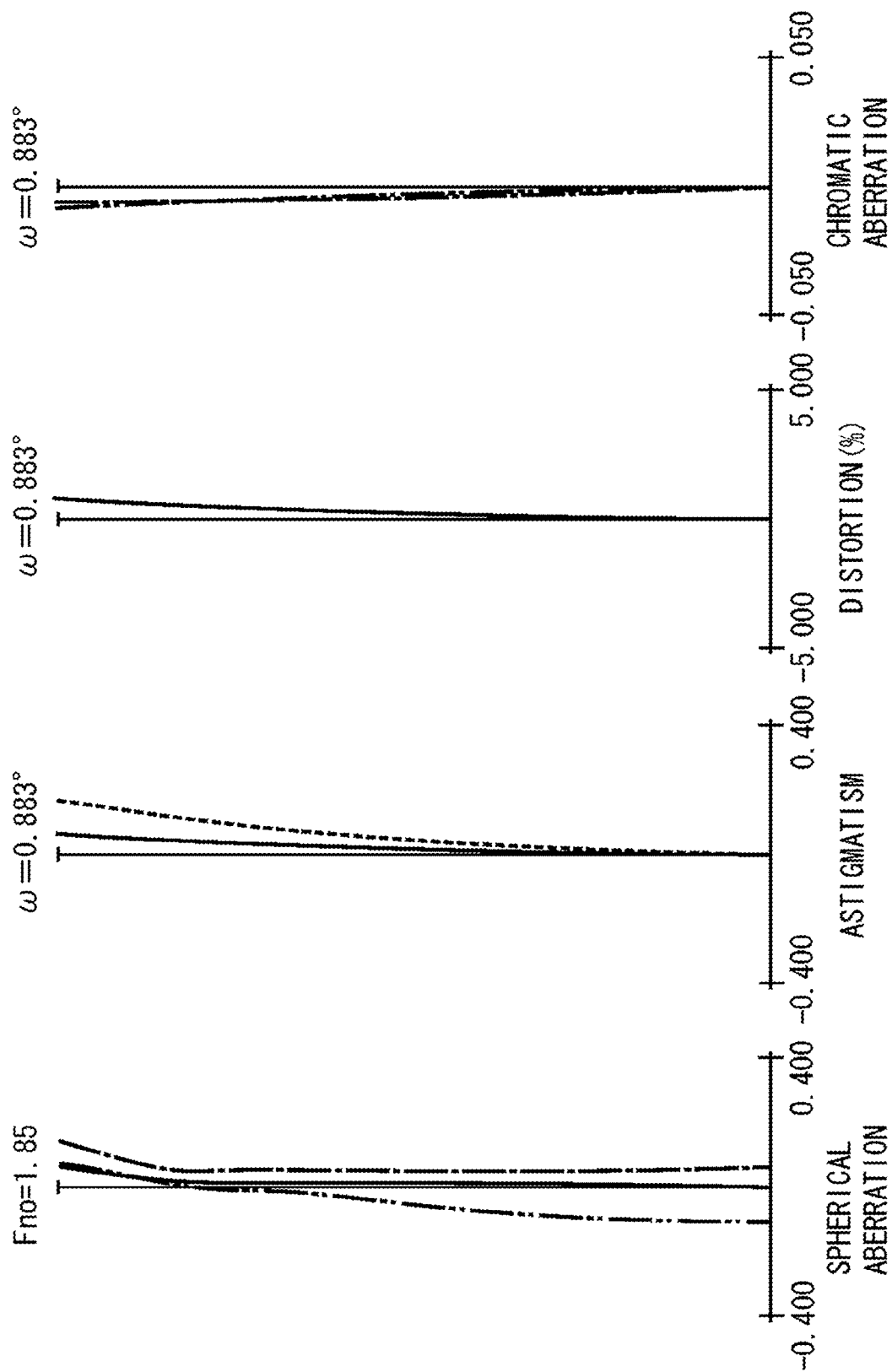
FIG. 11 is an aberration chart of example 3 of the present invention where f=357 mm.
Figure 12:
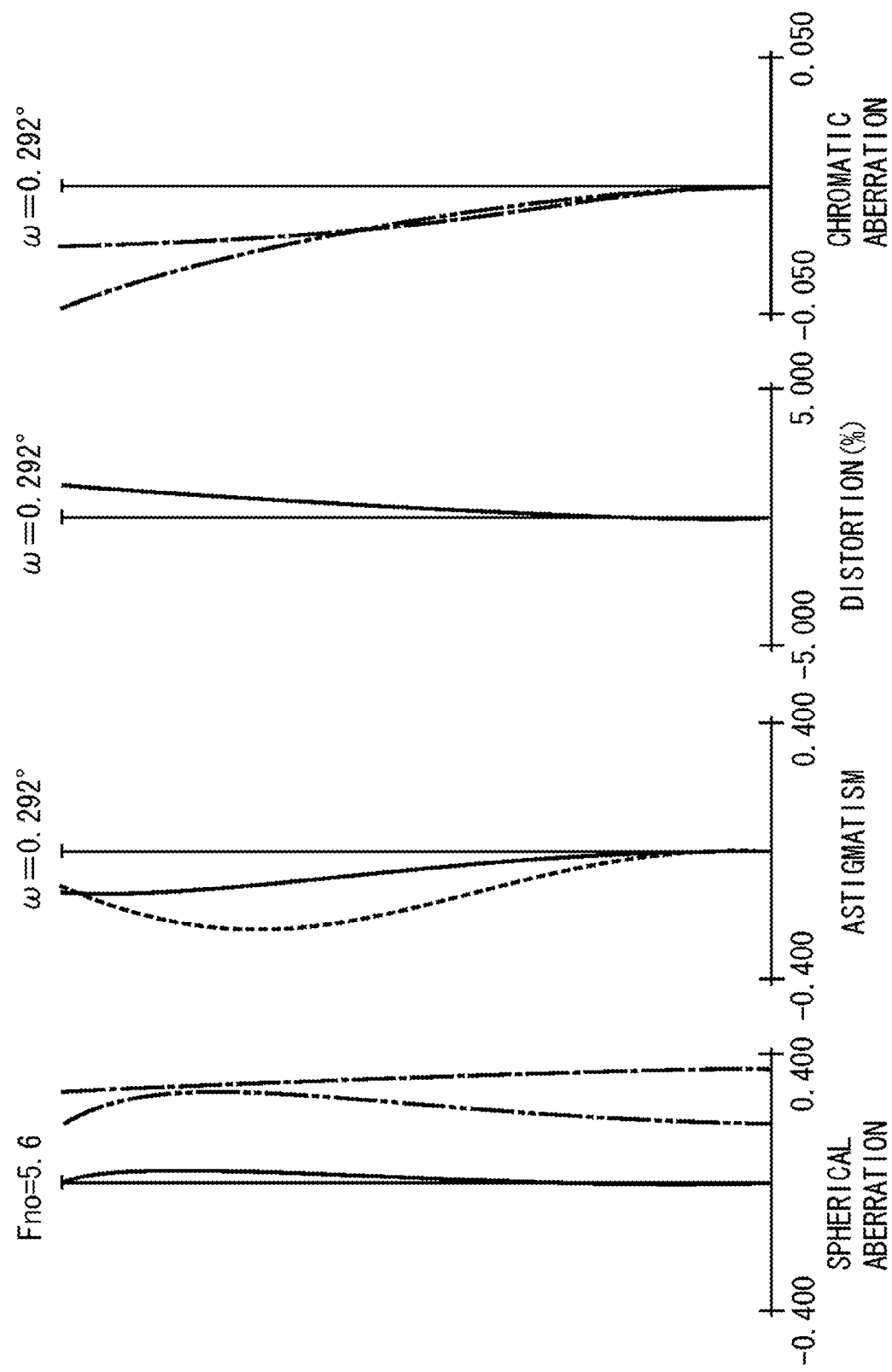
FIG. 12 is an aberration chart of example 3 of the present invention where f=1080 mm.

FIGS. 10 through 12 are vertical aberration charts according to example 3 at the wide-angle end, at the focal length of 357 mm, and at the telephoto end, respectively.

Figure 13:
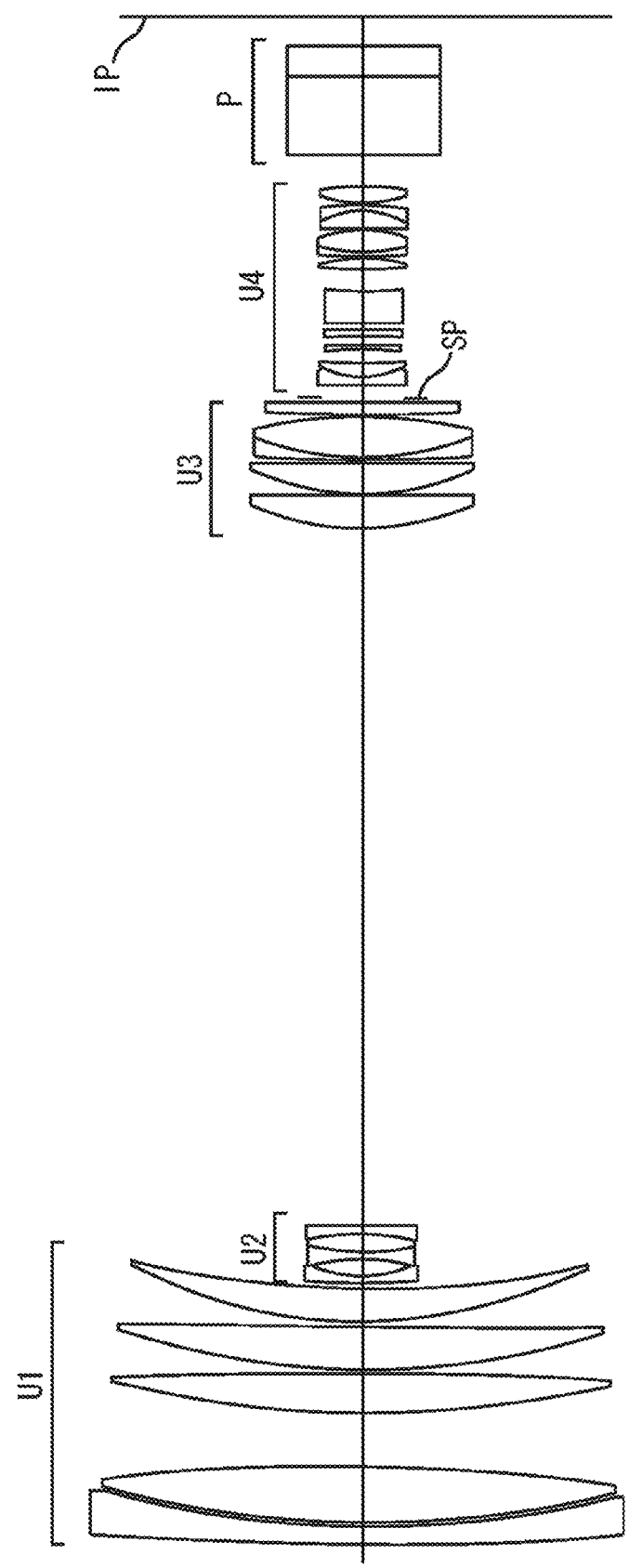
FIG. 13 is a lens cross section at the wide-angle end according to example 4 of the present invention.

FIG. 13 is a lens cross section of the zoom lens according to a fourth exemplary embodiment (example 4) of the present invention at the wide-angle end during focusing on an infinitely-distant object.

Figure 14:
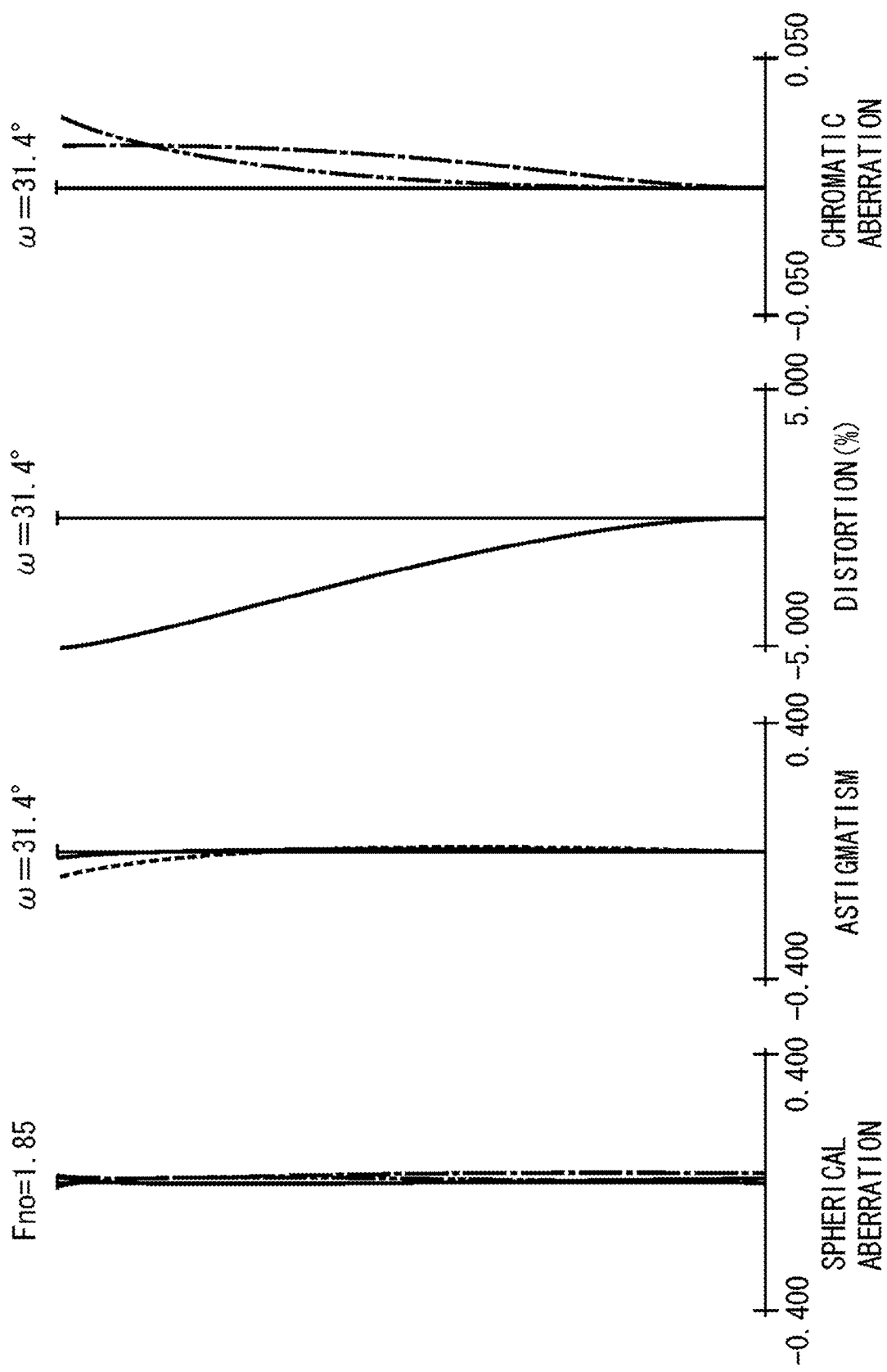
FIG. 14 is an aberration chart of example 4 of the present invention where f=9 mm.
Figure 15:
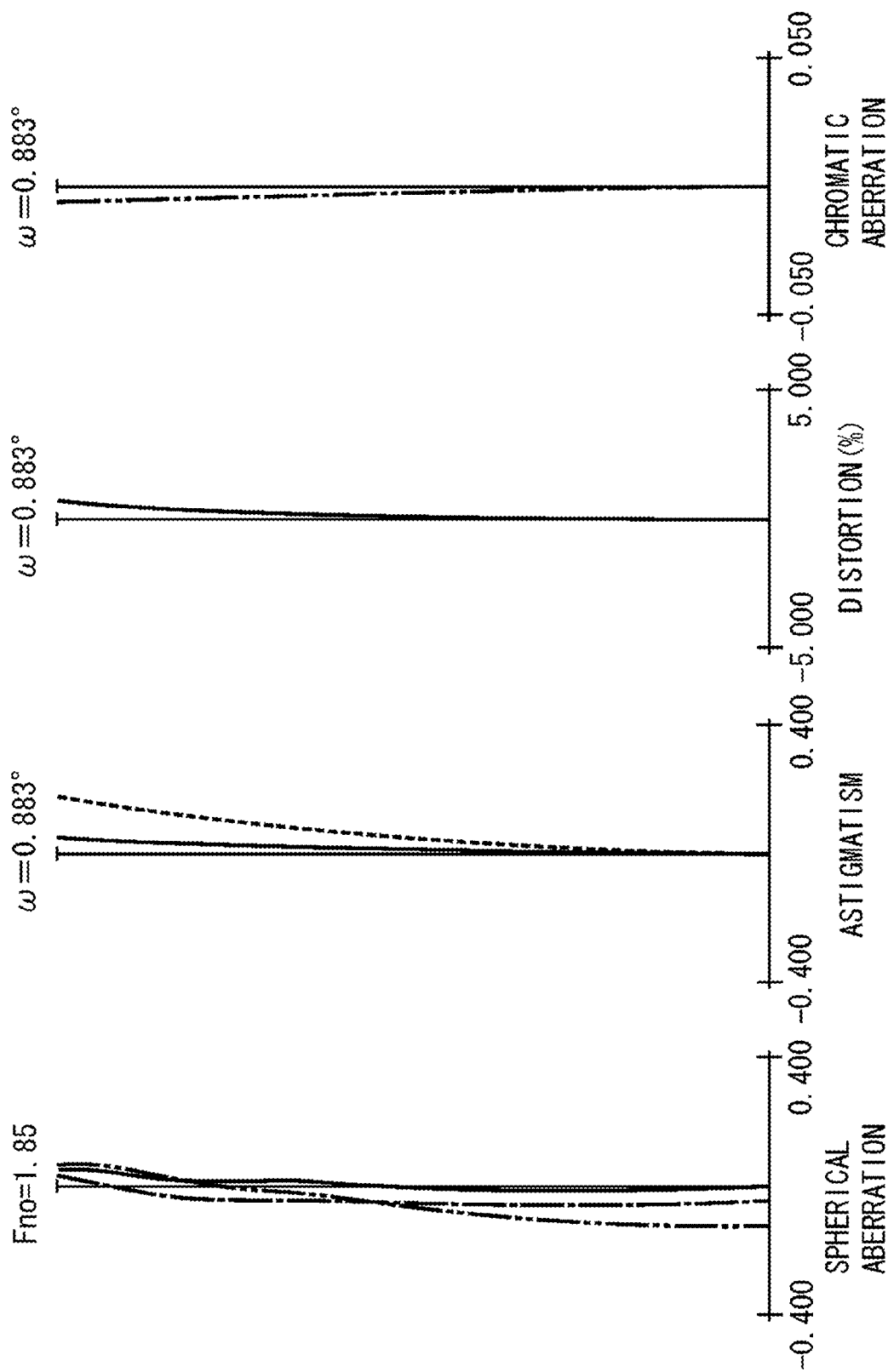
FIG. 15 is an aberration chart of example 4 of the present invention where f=357 mm.
Figure 16:
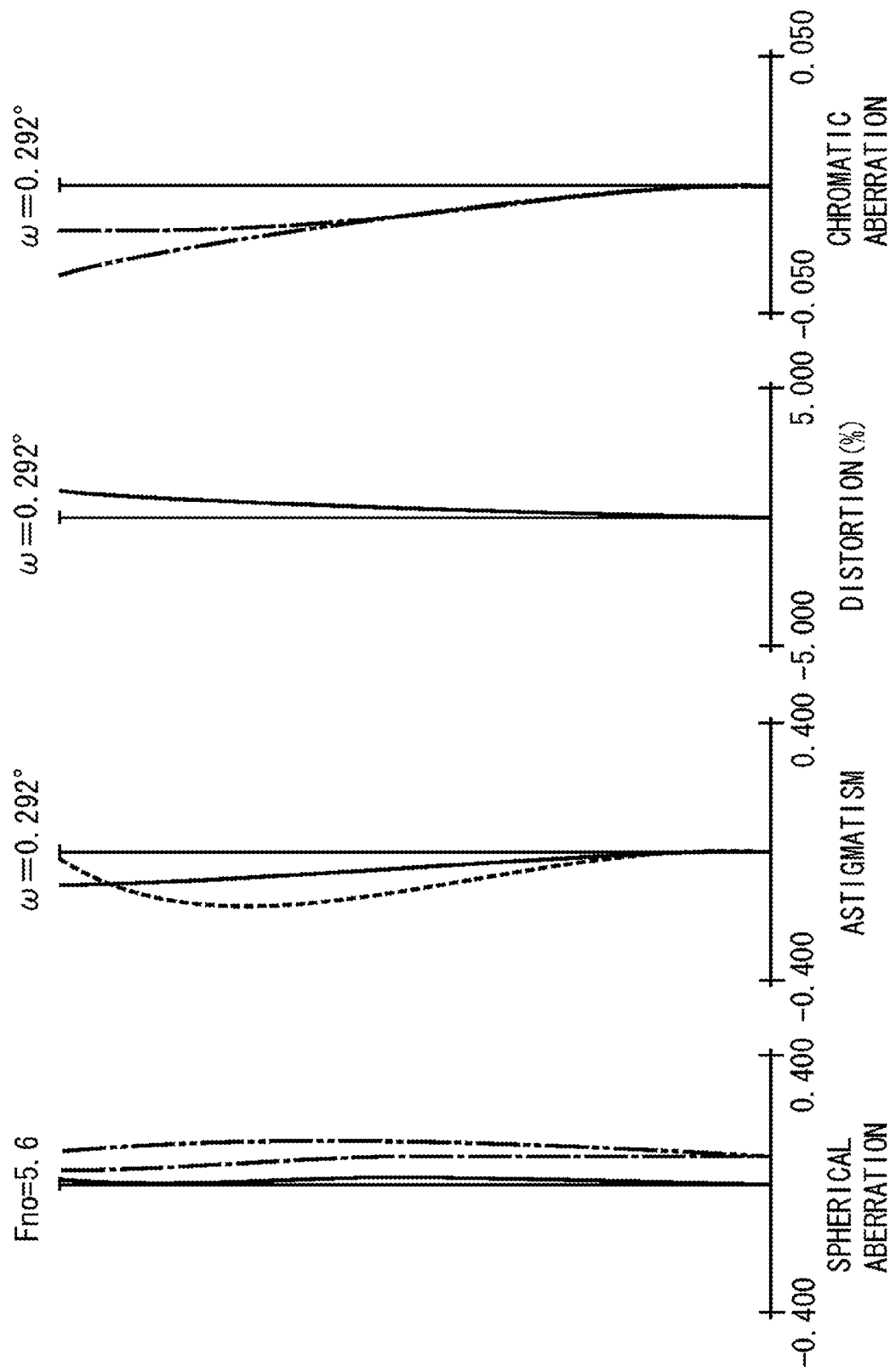
FIG. 16 is an aberration chart of example 4 of the present invention where f=1080 mm.

FIGS. 14 through 16 are vertical aberration charts according to example 4 at the wide-angle end, at the focal length of 357 mm, and at the telephoto end, respectively. The fourth exemplary embodiment is a zoom lens having a zoom ratio of 120.

Figure 17:
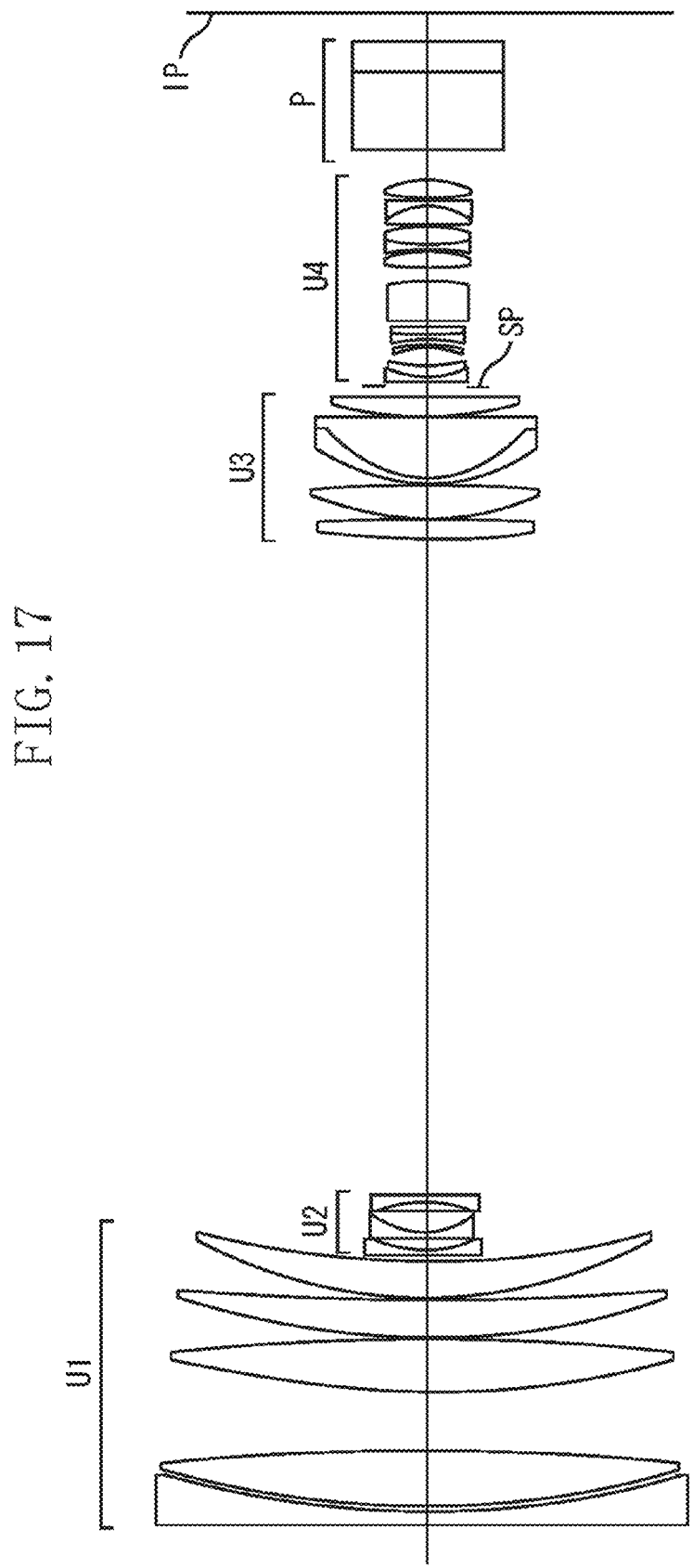
FIG. 17 is a lens cross section at the wide-angle end according to example 5 of the present invention.

FIG. 17 is a lens cross section of the zoom lens according to a fifth exemplary embodiment (example 5) of the present invention at the wide-angle end during focusing on an infinitely-distant object.

Figure 18:
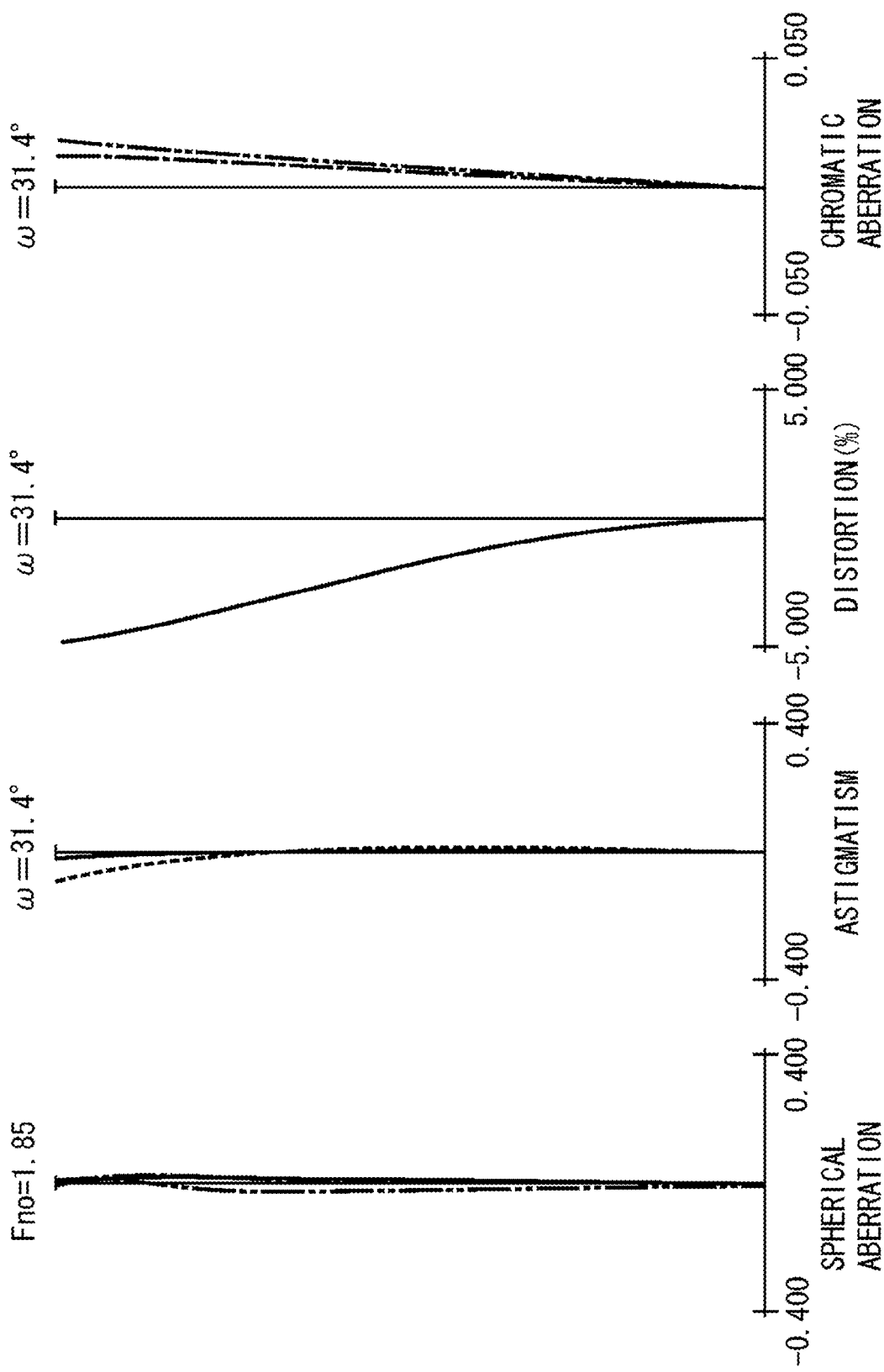
FIG. 18 is an aberration chart of example 5 of the present invention where f=9 mm.
Figure 19:
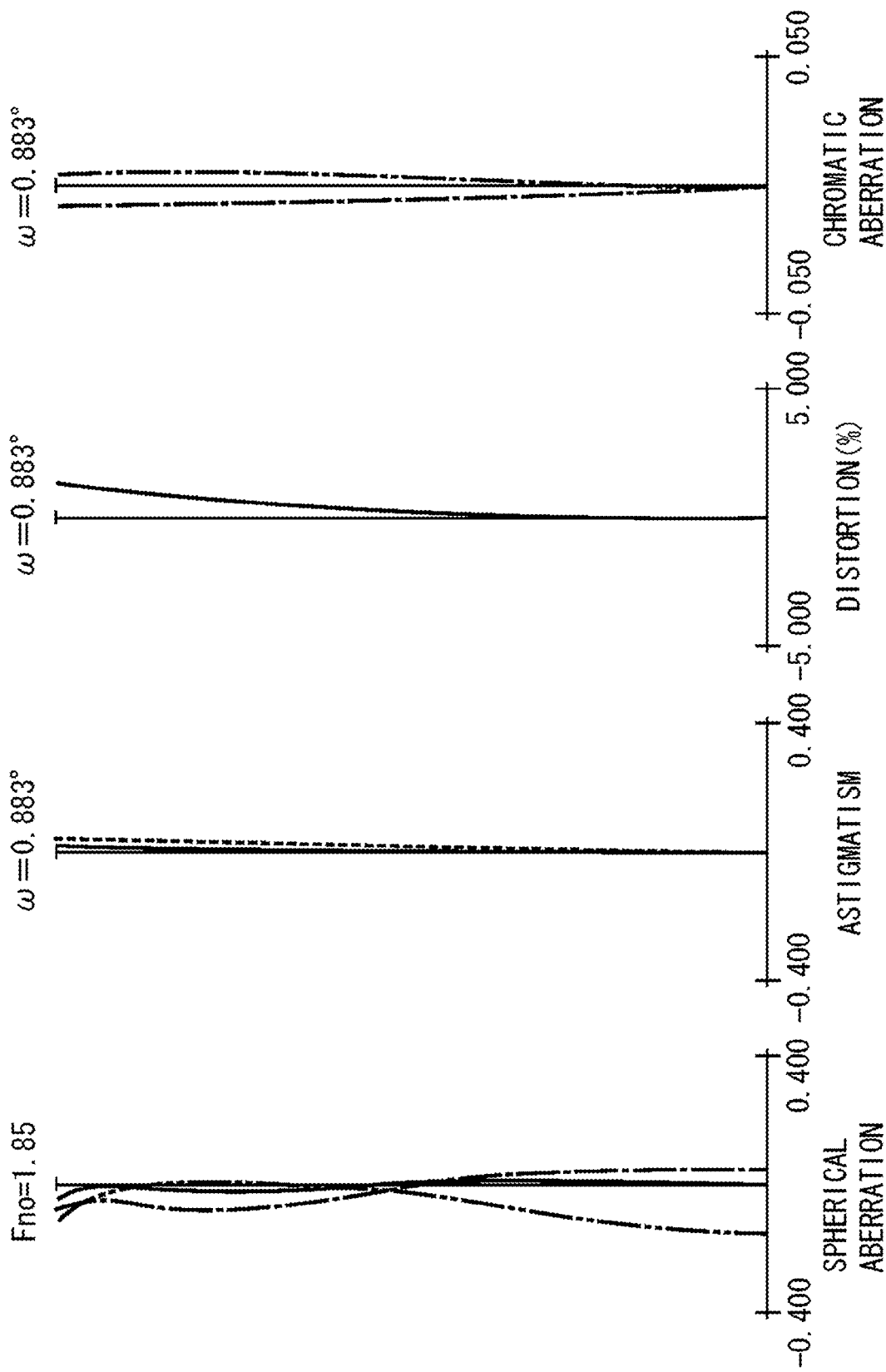
FIG. 19 is an aberration chart of example 5 of the present invention where f=357 mm.
Figure 20:
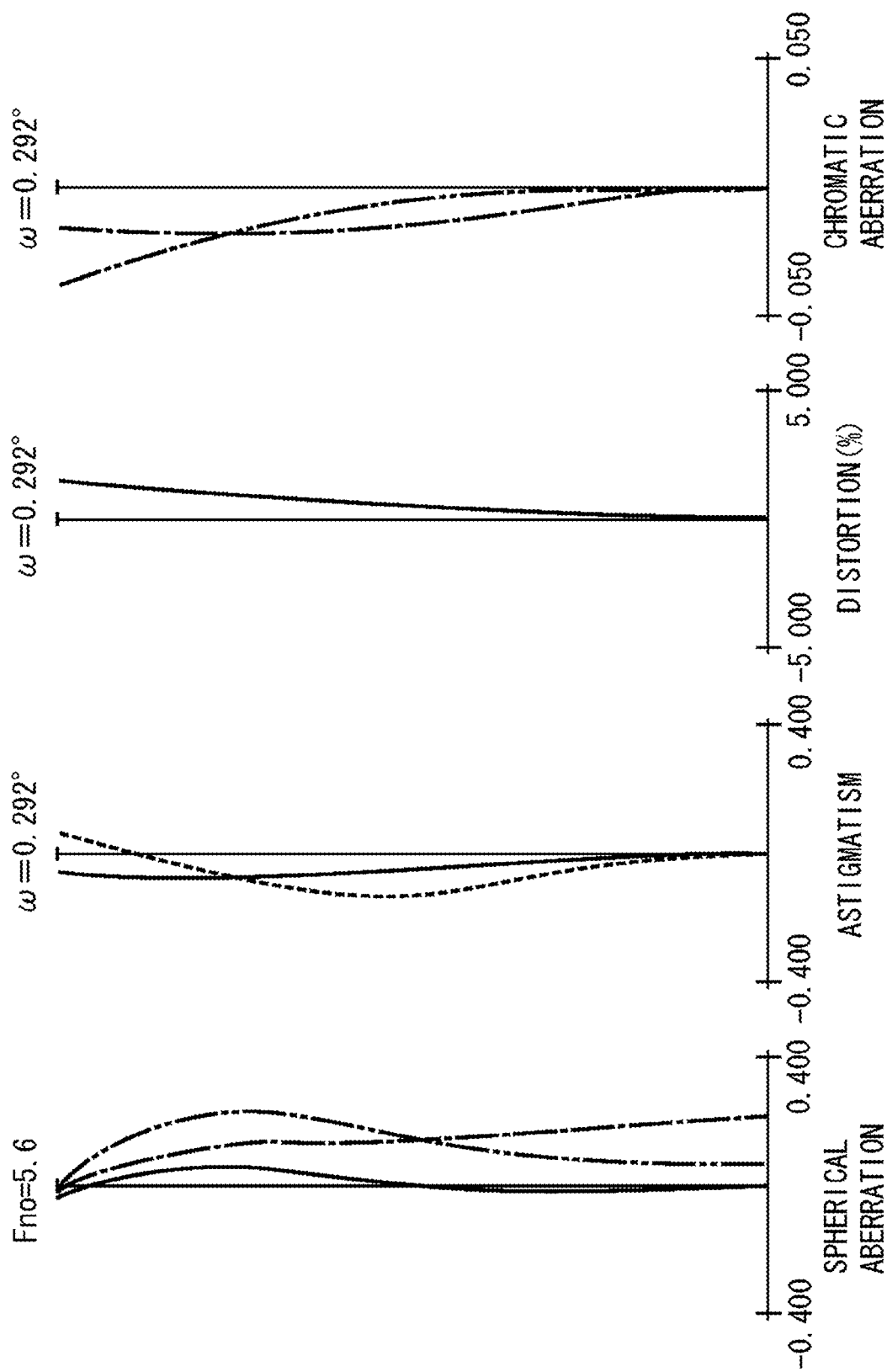
FIG. 20 is an aberration chart of example 5 of the present invention where f=1080 mm.

FIGS. 18 through 20 are vertical aberration charts according to example 5 at the wide-angle end, at the focal length of 357 mm, and at the telephoto end, respectively. The fifth exemplary embodiment is a zoom lens having a zoom ratio of 120.

Figure 21:
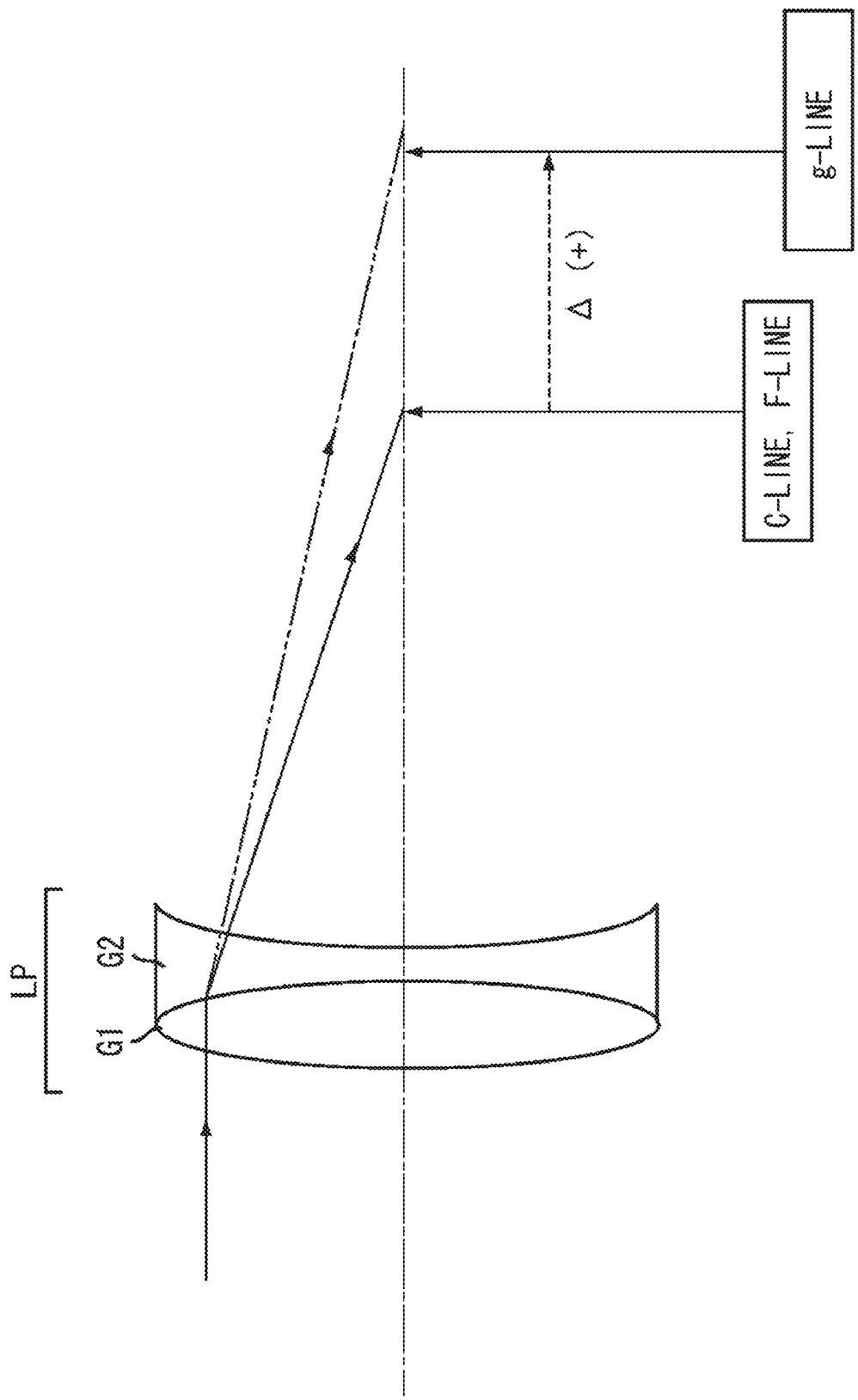
FIG. 21 schematically illustrates achromatism of two colors and residual secondary spectrum.

FIG. 21 schematically illustrates achromatism of two colors executed by a lens unit having a positive refractive power and residual secondary spectrum.

Figure 22:
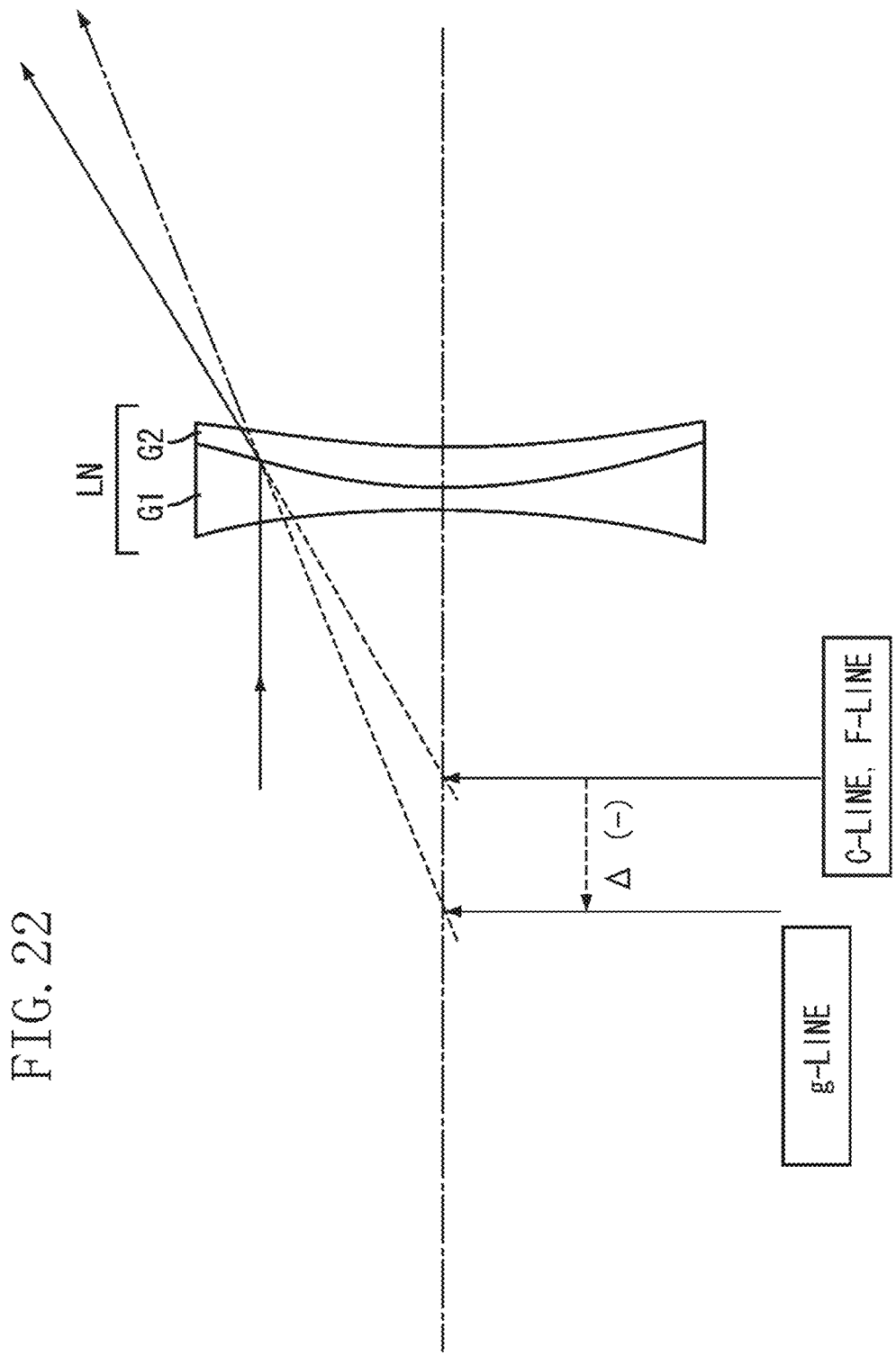
FIG. 22 schematically illustrates achromatism of two colors and residual secondary spectrum.

FIG. 22 schematically illustrates achromatism of two colors executed by a lens unit having a negative refractive power and residual secondary spectrum.

Figure 23:
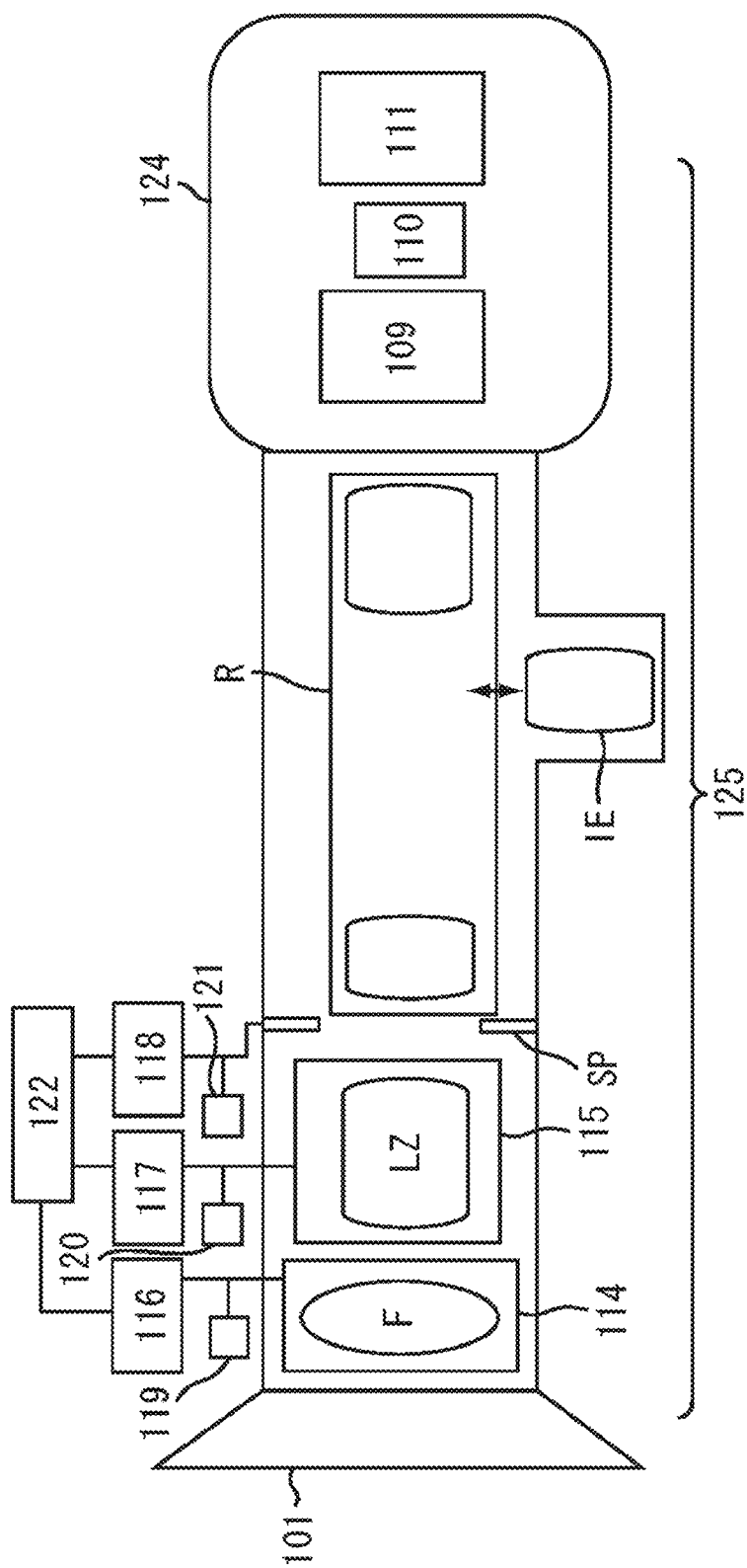
FIG. 23 illustrates an exemplary configuration of an image pickup apparatus according to an exemplary embodiment of the present invention.

FIG. 23 illustrates an exemplary configuration of an image pickup apparatus according to an exemplary embodiment of the present invention.

In the lens cross section of each exemplary embodiment, the first lens unit U1 having a positive refractive power is configured to remain stationary during zooming.

Figure 24B:
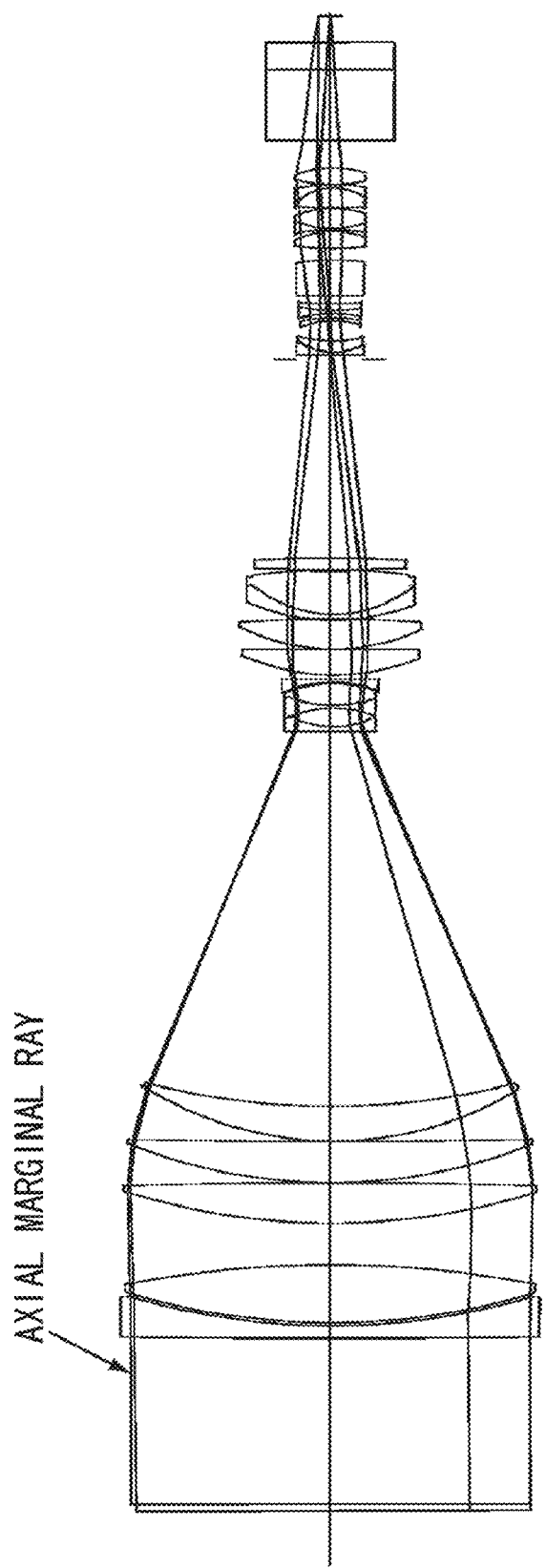

FIGS. 24A and 24B illustrate an example of an optical path when the zoom lens according to the first exemplary embodiment (example 1) focuses on an infinitely-distant object. More specifically, FIG. 24A illustrates an example of an optical path during focusing on an infinitely-distant object at the wide-angle end, and FIG. 24B illustrates an example of an optical path during focusing on an infinitely-distant object at the telephoto end.

The zoom lens according to each exemplary embodiment of the present invention moves the entire first lens unit U1 to execute focusing.

The second lens unit (variator lens unit) U2 having a negative refractive power is configured to move during zooming. The third lens unit (compensator lens unit) U3 having a positive refractive power is configured to move during zooming to correct (compensate for) the variation of the position of an image plane that may occur during variable magnification.

More specifically, the third lens unit U3 moves along the optical axis during variable magnification from the wide-angle end to the telephoto end in conjunction with the movement of the second lens unit U2 to correct the variation on the image plane that may occur during variable magnification. "SP" denotes an aperture stop. The aperture stop SP is located on the image side of the third lens unit U3.

The fourth lens unit (relay the lens unit) U4 is a lens unit for image forming and has a positive refractive power. "P" denotes an optical member, such as a color separation prism or an optical filter. The optical member P is a glass block in the lens cross section of each exemplary embodiment.

"IP" denotes an image plane. The image plane IP is equivalent to an imaging plane of a solid-state image sensor (photoelectric conversion element).

In each aberration chart, spherical aberration with respect to g-line light (indicated with a chain double-dashed line), e-line light (indicated with a solid line), and C-line light (indicated with an alternate long and short dash line) is illustrated.

Furthermore, astigmatism is indicated that may occur on a meridional image plane (indicated with a dotted line) with respect to e-line light and a sagittal image plane (indicated with solid line) with respect to e-line light. In addition, chromatic aberration of magnification that may occur with respect to g-line light (indicated with a chain double-dashed line) and C-line light (indicated with an alternate long-and-short dash line) is illustrated. "Fno" denote an F-number. "ω" denotes a half angle of view.

In each aberration chart, spherical aberration is illustrated in the unit of 0.4 mm. Furthermore, astigmatism is illustrated in the unit of 0.4 mm, the distortion in the unit of 5%, and chromatic aberration of magnification in the unit of 0.05 mm.

In each exemplary embodiment described below, each of the wide-angle end and the telephoto end refers to a zooming position when a lens unit for varying magnification (the second lens unit U2) is positioned at each of the ends of a range in which the magnification varying lens unit can mechanically move along the optical axis.

Now, each exemplary embodiment of the present invention will be described in detail below.

The zoom lens according to each exemplary embodiment includes, in order from the object side to the image side, a first lens unit having a positive refractive power and configured to remain stationary during zooming, a second lens unit having a negative refractive power and configured to move during zooming, a third lens unit having a positive refractive power and configured to move along the optical axis in conjunction with the movement of the second lens unit to correct variation of the image plane that may occur due to variable magnification, and a fourth lens unit for image forming having a positive refractive power and configured to remain stationary during zooming (for zooming).

The second lens unit U2 includes at least one positive lens and at least one negative lens. Average values of Abbe number (ν) and relative partial dispersion (θ) of materials of the at least one negative lens included in the second lens unit U2 (νna, θna) and average values of Abbe number (ν) and relative partial dispersion (θ) of materials of the at least one positive lens included in the second lens unit U2 (νpa, θpa) satisfy the following condition:

$$(\theta pa - \theta na)/(\nu pa - \nu na) < -3.7 \times 10^{-3} \quad (1).$$

In each exemplary embodiment, the relative partial dispersion and the Abbe number of the material of the optical element (lens) used in the present exemplary embodiment are defined as follows. When refractive indices with respect to g-line light (wavelength: 435.8 nm), F-line light (wavelength: 486.1 nm), d-line light (wavelength: 587.6 nm), and C-line light (wavelength: 656.3 nm) of Fraunhofer line are represented with Ng, NF, Nd, and NC, respectively, the Abbe number (νd) and the relative partial dispersion (θgF) with respect to g-line light and F-line light are defined by the following equations:

$$\nu d = (Nd-1)/(NF-NC) \quad (9)$$

$$\theta gF = (Ng-NF)/(NF-NC) \quad (10).$$

Each exemplary embodiment sets the lens configuration of the second lens unit U2 in the above-described manner and satisfies the condition (1) to effectively execute achromatism.

A relative partial dispersion (θgF) of a conventional and existing optical material is distributed in a narrow range in terms with the Abbe number (νd). In general, as the Abbe number (νd) becomes smaller, the relative partial dispersion (θgF) may become greater.

A condition for effectively correcting chromatic aberration by using a thin contact lens system including two lenses G1 and G2 having refractive powers (φ1, φ2) and Abbe numbers (ν1, ν2) can be expressed by the following equation:

$$\phi 1/\nu 1 + \phi 2/\nu 2 = E \quad (11).$$

In this case, a combined refractive power φ can be expressed by the following equation:

$$\phi = \phi 1 + \phi 2 \quad (12).$$

The same can apply when the thin contact lens system includes three or more lenses.

If E=0 in equation (11), then in correcting chromatic aberration, the image forming positions of C-line light and F-line light match each other. In particular, in a zoom lens having a high zoom ratio, in order to effectively correct variation of chromatic aberration that may occur during variable magnification, the zoom lens corrects chromatic aberration that may occur in each lens unit (i.e., "E" in equation (11)) to the level as low as approximately 0.

Referring to FIG. 21, in executing achromatism in a lens unit LP having a positive refractive power, a positive lens G1 is made of a material having a high Abbe number ν1 while a negative lens G2 is made of a material having a low Abbe number ν2.

Accordingly, the positive lens G1 has a low relative partial dispersion θ1 while the negative lens G2 has a high relative partial dispersion θ2. Therefore, in correcting chromatic aberration with respect to F-line light and C-line light, then the image forming position of g-line light is displaced towards the image side.

In focusing on an infinitely-distant object, an amount of secondary spectrum Δ, which is an amount of displacement when light flux is incident to the zoom lens, can be expressed by the following equation:

$$\Delta = -(1/\phi) \cdot (\theta 1 - \theta 2)/(\nu 1 - \nu 2) \quad (13).$$

FIG. 24A illustrates an example of an optical path during focusing on an infinitely-distant object at the wide-angle end. FIG. 24B illustrates an example of an optical path during focusing on an infinitely-distant object at the telephoto end. In the four-unit zoom lens according to an present exemplary embodiment of the present invention, the amount of secondary spectrum Δ may become large in the first lens unit U1, whose refractive power is low and in which an axial marginal ray goes at a relatively high optical path at the telephoto end.

Referring to FIG. 22, in executing achromatism in a lens unit LN having a negative refractive power, a negative lens G1 is made of a material having a high Abbe number ν1 while a positive lens G2 is made of a material having a low Abbe number ν2. Accordingly, in correcting chromatic aberration with respect to F-line light and C-line light, the image forming point of g-line light is displaced towards the object side. Therefore, a value of the secondary spectrum amount Δ becomes negative. In the four-unit zoom lens according to each exemplary embodiment, the phenomenon may occur in the second lens unit U2 having a negative refractive power. Image forming magnifications of the second, the third, and the fourth lens units U2, U3, and U4 (β2, β3, and β4) satisfy the following equation:

$$\Delta = \left(\frac{-1}{\varphi 1}\right) \cdot \Delta 1 \cdot \beta 2^2 \cdot \beta 3^2 \cdot \beta 4^2 + \left(\frac{-1}{\varphi 2}\right) \cdot \Delta 2 \cdot (\beta 2 - 1)^2 \cdot \beta 3^2 \cdot \beta 4^2 + \left(\frac{-1}{\varphi 3}\right) \cdot \Delta 3 \cdot (\beta 3 - 1)^2 \cdot \beta 4^2 + \left(\frac{-1}{\varphi 4}\right) \cdot \Delta 4 \cdot (\beta 4 - 1)^2. \quad (14)$$

Accordingly, the first term in equation (14) has a negative value while the second term has a positive value. Thus, if the absolute value of the secondary spectrum Δ2 in the second lens unit U2 is increased, the secondary spectrum Δ1 of axial chromatic aberration occurring in the first lens unit U1 can be effectively corrected.

Furthermore, a tolerable amount of residual secondary spectrum Δ1 increases. Accordingly, each exemplary embodiment can reduce the refractive power of each constituent lens by increasing the difference between the Abbe numbers of the materials of the positive lens and the negative lens of the first lens unit U1. Thus, each exemplary embodiment can effectively reduce the total thickness of the first lens unit U1.

The condition (1), considering the above-described problem and phenomenon and a method for addressing the same, provides a condition for appropriately setting the Abbe number and the relative partial dispersion of the positive lens and the negative lens constituting the second lens unit U2.

If the upper limit value of the condition (1) is exceeded, then the secondary spectrum may be undercorrected by the second lens unit U2. Accordingly, it becomes difficult to effectively correct axial chromatic aberration at the telephoto end.

In addition, it is further useful if the upper limit value of the condition (1) is altered as follows:

$$(\theta pa - \theta na)/(\nu pa - \nu na) < -3.72 \times 10^{-3} \quad (1a).$$

Furthermore, it is yet further useful if each exemplary embodiment satisfies the following condition (1b) in addition to the above-described condition (1):

$$-10.00 \times 10^{-3} \text{ (yet further useful if terms ``}-6.50 \times 10^{-3}\text{''} \text{ is used instead)} < (\theta pa - \theta na)/(\nu pa - \nu na) \quad (1b).$$

Either one of the upper limit value and the lower limit value of the conditions (1a) and (1b) can be substituted with the upper limit value or the lower limit value of the condition (1) where necessary.

With the above-described configuration, each exemplary embodiment can reduce the lens total length (i.e., the distance between a first lens surface to the image plane, which is also referred to as an "optical total length") while achieving a high variable magnification ratio (zoom ratio) of 100 or higher. In addition, each exemplary embodiment having the above-described configuration can achieve a high optical performance by effectively correcting axial chromatic aberration at the telephoto.

In each exemplary embodiment of the present invention, it is further useful to satisfy at least one of the following conditions. More specifically, a focal length of a negative lens, of the lenses included in the second lens unit U2, made of a material whose Abbe number is the smallest of those of the lenses and an Abbe number and a relative partial dispersion of the material of the negative lens (f2n, νn, θn), a focal length of a positive lens, of the lenses included in the second lens unit U2, made of a material whose Abbe number is the greatest of those of the lenses and an Abbe number and a relative partial dispersion of the material of the positive lens (f2p, νp, θp), a total value of refractive powers of positive lenses included in the second lens unit U2 (φp), a total value of refractive powers of negative lenses included in the second lens unit U2 (φn), a refractive power of the second lens unit U2 (φ2), a focal length of the first lens unit U1 (f1), a focal length of the second lens unit U2 (f2), a focal length of the zoom lens at the telephoto end (ftele), and a focal length of the zoom lens at the wide-angle end (fwide) satisfy at least one of the following conditions:

$$(\theta p - \theta n)/(\nu p - \nu n) < -5.0 \times 10^{-3} \quad (2)$$

$$-2.0 < (1/f2)/(1/f2p - 1/f2n) < -0.2 \quad (3)$$

$$\phi p/\phi 2 < -0.5 \quad (4)$$

$$\phi n/\phi 2 > 1.5 \quad (5)$$

$$9.5 < |f1/f2| < 11 \quad (6)$$

$$3.9 < ftele/f1 < 6 \quad (7)$$

$$25 < f1/fwide < 30 \quad (8).$$

The condition (2) provides a condition for appropriately setting the Abbe number and the relative partial dispersion of the positive lens and the negative lens to effectively correct aberration in the secondary spectrum that may occur particularly in the second lens unit U2, of the lenses constituting the second lens unit U2. Each exemplary embodiment can effectively correct axial chromatic aberration at the telephoto end by satisfying the condition (2).

If the upper limit value of the condition (2) is exceeded, then the secondary spectrum may be undercorrected by the second lens unit U2. Accordingly, it becomes difficult to effectively correct axial chromatic aberration at the telephoto end while achieving a high variable magnification ratio (high zoom ratio) at the same time.

The condition (3) provides a condition for appropriately setting the ratio of the refractive power of the entire second lens unit U2 and the refractive power of the positive lens and the negative lens included in the second lens unit U2.

If the lower limit value of the condition (3) is exceeded, then the secondary spectrum may be undercorrected by the positive lens and the negative lens of the second lens unit U2. Accordingly, it becomes difficult to effectively correct axial chromatic aberration at the telephoto end while achieving a high variable magnification ratio (high zoom ratio) at the same time.

The condition (4) provides a condition for appropriately setting the ratio of the refractive power of the positive lens included in the second lens unit U2 to the refractive power of the entire second lens unit U2. The condition (5) provides a condition for appropriately setting the ratio of the refractive power of the negative lens included in the second lens unit U2 to the refractive power of the entire second lens unit U2.

If the upper limit value of the condition (4) is exceeded or if the lower limit value of the condition (5) is exceeded, then the secondary spectrum may be undercorrected by the positive lens and the negative lens of the second lens unit U2. Accordingly, it becomes difficult to effectively correct axial chromatic aberration at the telephoto end while achieving a high variable magnification ratio (high zoom ratio) at the same time.

The condition (6) provides a condition for appropriately setting the ratio of the focal length of the first lens unit U1 to the focal length of the second lens unit U2. Each exemplary embodiment can reduce the lens total length while achieving a high variable magnification ratio (zoom ratio) of 100 or higher by reducing the stroke (amount of movement) of the lens unit that moves during variable magnification while effectively correcting axial chromatic aberration.

If the lower limit value of the condition (6) is exceeded, then the stroke of the moving lens unit may increase, which may result in increasing the size of the entire zoom lens system. On the other hand, if the upper limit value of the condition (6) is exceeded, then the total size of the zoom lens system can be readily reduced but the amount of variation of aberration that may occur during variable magnification (zooming) may increase.

The condition (7) provides a condition for the ratio of the focal length of the entire zoom lens at the telephoto end to the focal length of the first lens unit U1. By satisfying the condition (7), each exemplary embodiment can effectively correct axial chromatic aberration while achieving a high variable magnification ratio (high zoom ratio) at the same time.

If the lower limit value of the condition (7) is exceeded, then the focal length of the first lens unit U1 may increase. Accordingly, it becomes difficult to achieve a variable magnification ratio (zoom ratio) as high as 100 or higher while reducing the size of the entire zoom lens system.

On the other hand, if the upper limit value of the condition (7) is exceeded, then the size of the entire zoom lens system can be readily reduced. However, it becomes difficult to achieve a high optical performance at the telephoto end. In particular, it becomes difficult to effectively correct axial chromatic aberration at the telephoto end.

The condition (8) provides a condition for appropriately setting the ratio of the focal length of the first lens unit U1 to the focal length of the entire zoom lens system at the wide-angle end. If the lower limit value of the condition (8) is exceeded, then the size of the entire zoom lens can be readily reduced. However, it becomes difficult to achieve a wide angle of view at the wide-angle end.

On the other hand, if the upper limit value of the condition (8) is exceeded, then the angle of view can be readily increased at the wide-angle end. However, in this case, the effective diameter of the first lens unit U1 may increase. Accordingly, it becomes difficult to reduce the size of the entire zoom lens system.

In each exemplary embodiment, in order to reduce the variation of aberrations that may occur during aberration correction or zooming while reducing the size of the entire zoom lens, the ranges of the values in the conditions (2) through (8) can be altered as follows:

$$(\theta p - \theta n)/(\nu p - \nu n) < -5.1 \times 10^{-3} \quad (2a)$$

$$-1.5 < (1/f2)/(1/f2p - 1/f2n) < -0.5 \quad (3a)$$

$$\phi p/\phi 2 < -0.6 \quad (4a)$$

$$\phi n/\phi 2 > 1.55 \quad (5a)$$

$$9.51 < |f1/f2| < 10.90 \quad (6a)$$

$$3.9 < f\text{tele}/f1 < 5.5 \quad (7a)$$

$$25 < f1/f\text{wide} < 29 \quad (8a).$$

In each exemplary embodiment, in order to reduce the variation of aberrations that may occur during aberration correction or zooming while reducing the size of the entire zoom lens, the ranges of the values in the conditions (2), (4), and (5) can be altered as follows:

$$-10.20 \times 10^{-3} \text{ (yet further useful if terms ``}-7.60 \times 10^{-3}\text{''}$$
$$\text{is used instead}) < (\theta p - \theta n)/(\nu p - \nu n) \quad (2b)$$

$$-10.50 \text{ (yet further useful if a value ``}-7.75\text{'' is used}$$
$$\text{instead}) < \phi p/\phi 2 \quad (4b)$$

$$2.5 \text{ (yet further useful if a value ``}1.72\text{'' is used}$$
$$\text{instead}) > \phi n/\phi 2 \quad (5b).$$

Either one of the upper limit value and the lower limit value of the conditions (2a) through (8a), (2b), (4b), and (5b) can be substituted with the upper limit value or the lower limit value of the conditions (2) through (8) where necessary.

Now, the configuration, of lenses included in the zoom lens according to each exemplary embodiment, other than those described above, will be described in detail below.

The zoom lens according to each exemplary embodiment includes the following lens units in order from the object side to the image side. More specifically, the first lens unit U1 includes five lenses including a negative lens whose surface on the image side has a concave shape, three positive lenses each of whose surface on the object side has a convex shape, and a positive lens having a meniscus shape and whose surface on the object side has a convex shape.

Furthermore, the second lens unit U2 includes four lenses including a negative lens whose surface on the image side has a concave shape, a cemented lens including a negative lens both of whose surfaces have a concave shape and a positive lens whose surface on the object side has a convex shape, and a negative lens whose surface on the object side has a concave shape.

Alternatively, it is also useful if the second lens unit U2 includes four lenses including a negative lens whose surface on the image side has a concave shape, a cemented lens including a negative lens both of whose surfaces have a concave shape and a positive lens both of whose surfaces have a convex shape, and a negative lens whose surface on the object side has a concave shape.

In addition, the zoom lens according to each exemplary embodiment includes the third lens unit U3, which includes five lenses including two positive lenses whose surface on the object side has a convex shape, a cemented lens including a negative lens and a positive lens, and a positive lens.

In addition, the zoom lens according to each exemplary embodiment includes the fourth lens unit U4, which includes twelve lenses in total, including a combination of positive lenses and negative lenses.

FIG. 23 illustrates an exemplary configuration of an image pickup apparatus (television camera system) having the zoom lens according to each exemplary embodiment described above as its photographic optical system.

Referring to FIG. 23, an image pickup apparatus 125 includes a zoom lens 101, which is either one of the zoom lenses according to the above-described first through fifth exemplary embodiments. The zoom lens 101 can be detachably mounted on a camera body 124.

The zoom lens 101 includes a first lens unit F, a variable magnification unit LZ, and a fourth lens unit for image forming R. The first lens unit F includes a focusing lens unit. The variable magnification unit LZ includes a second lens unit configured to move along the optical axis to execute variable magnification.

In addition, the variable magnification unit LZ includes a third lens unit configured to move along the optical axis to correct variation on the image plane that may occur during variable magnification. Furthermore, the zoom lens 101 includes an aperture stop SP.

The fourth lens unit for image forming R includes a lens unit IE, which can enter into or exit from the optical path. The lens unit IE can change the range of the focal length of the entire zoom lens 101. The lens unit IE can be removed from the zoom lens 101.

In addition, the zoom lens 101 includes driving mechanisms 114 and 115, such as a helicoid or a cam, which drives the first lens unit F and the variable magnification unit LZ, respectively, along the optical axis.

The image pickup apparatus 125 includes motors (driving units) 116 through 118, which electrically drive the driving mechanisms 114 and 115 and the aperture stop SP, respectively. Detectors 119 through 121, such as an encoder, a potentiometer, or a photo-sensor, are configured to detect and measure the position of the first lens unit F and the variable magnification unit LZ on the optical axis and the aperture diameter of the aperture stop SP.

In addition, the camera body 124 includes a glass block 109, which is equivalent to an optical filter or a color separation prism provided within the camera body 124. Furthermore, the camera body 124 includes a solid-state image sensor (photoelectrical conversion element) 110, such as a charge-coupled device (CCD) sensor or a complementary metal-oxide semiconductor (CMOS) sensor. The solid-state image sensor 110 is configured to receive an object image formed by the zoom lens 101.

Furthermore, central processing units (CPUs) 111 and 122 control the entire operation of the camera body 124 and the zoom lens 101, respectively.

By applying the zoom lens according to each exemplary embodiment of the present invention having the configuration described above to a television camera, an image pickup apparatus having a high optical performance can be implemented.

Now, examples 1 through 5, which respectively correspond to the first through fifth exemplary embodiments of the present invention, are set forth below. In each of the examples 1 through 5, "i" denotes the order of a surface from the object side, "ri" denotes a radius of curvature of the i-th optical surface (an i-th surface), "di" denotes an axial interval between the i-th surface and the (i+1)th surface, "ndi" and "vdi" respectively denote a refractive index and an Abbe number of the i-th optical material with respect to d-line light.

For the focal length, the F-number, and the angle of view, values obtained during focusing on an infinitely-distant object are described. "BF" denotes an air-equivalent back focus. In each of the following examples, three surfaces closest to the image side are a glass material (optical block), such as a filter or a face plate. In addition, the relationship between each condition described above and each example is set forth in Table 1.

In addition, "k" denotes a conic coefficient, and each of "A4", "A6", and "A8" denotes an aspheric coefficient. The aspheric shape is expressed as:

$$X = (H^2/R)/[1+\{1-(1+k)(H/R)^2\}^{1/2}] + A4H^4 + A6H^6 + A8H^8$$

where "X" denotes a displacement from a surface vertex along the optical axis in a position at a height "H" from the optical axis, and "R" denotes a paraxial radius of curvature. Furthermore, "e-Z" denotes "$\times 10^{-Z}$."

Example 1

| Surface No. | r | di | nd | vd | Effective Diameter | θgF | Focal Length |
|---|---|---|---|---|---|---|---|
| 1 | 7000.000 | 6.00 | 1.83400 | 37.2 | 195.69 | 0.5775 | −433.032 |
| 2 | 345.379 | 2.00 | | | 189.57 | | |
| 3 | 345.379 | 25.91 | 1.43387 | 95.1 | 190.61 | 0.5373 | 484.173 |
| 4 | −527.375 | 20.74 | | | 191.16 | | |
| 5 | 331.921 | 18.73 | 1.43387 | 95.1 | 193.34 | 0.5373 | 706.637 |
| 6 | −4082.422 | 0.25 | | | 192.86 | | |
| 7 | 264.903 | 19.29 | 1.43387 | 95.1 | 188.46 | 0.5373 | 652.508 |
| 8 | 3887.712 | 0.25 | | | 187.25 | | |
| 9 | 171.964 | 16.12 | 1.43875 | 95.0 | 174.67 | 0.5342 | 716.251 |
| 10 | 367.798 | Variable | | | 172.80 | | |
| 11 | 1547.347 | 2.00 | 2.00330 | 28.3 | 42.77 | 0.5980 | −44.235 |
| 12 | 43.467 | 8.24 | | | 37.79 | | |
| 13 | −55.129 | 2.00 | 1.88300 | 40.8 | 37.77 | 0.5667 | −32.903 |
| 14 | 63.246 | 9.63 | 1.92286 | 18.9 | 41.36 | 0.6495 | 35.902 |
| 15 | −66.171 | 1.02 | | | 42.37 | | |
| 16 | −59.413 | 2.00 | 1.77250 | 49.6 | 42.43 | 0.5521 | −74.892 |
| 17* | 2736.384 | Variable | | | 44.72 | | |
| 18 | 108.766 | 12.13 | 1.56907 | 71.3 | 81.41 | 0.5451 | 185.041 |
| 19* | −3543.181 | 0.20 | | | 81.81 | | |
| 20 | 100.674 | 13.34 | 1.49700 | 81.5 | 83.34 | 0.5375 | −74.573 |
| 21 | −613.181 | 0.20 | | | 82.78 | | |
| 22 | 103.700 | 2.50 | 1.84666 | 23.8 | 79.37 | 0.6205 | −171.939 |
| 23 | 60.132 | 20.33 | 1.43875 | 95.0 | 74.98 | 0.5342 | 113.871 |
| 24 | −268.844 | 0.20 | | | 73.52 | | |
| 25* | 201.189 | 5.73 | 1.43875 | 95.0 | 71.02 | 0.5342 | 373.651 |
| 26 | −889.802 | Variable | | | 69.63 | | |
| 27 (Stop) | ∞ | 1.42 | | | 32.62 | | |
| 28 | 823.159 | 1.40 | 1.81600 | 46.6 | 31.65 | 0.5568 | −39.032 |
| 29 | 30.790 | 0.20 | | | 29.87 | | |
| 30 | 28.600 | 5.57 | 1.84666 | 23.8 | 30.03 | 0.6205 | 54.549 |

-continued

| | | | | | | | |
|---|---|---|---|---|---|---|---|
| 31 | 67.298 | 8.49 | | | 28.84 | | |
| 32 | −43.101 | 1.40 | 1.88300 | 40.8 | 26.96 | 0.5667 | −112.782 |
| 33 | −76.811 | 2.57 | | | 27.22 | | |
| 34 | −55.688 | 1.80 | 1.75500 | 52.3 | 26.99 | 0.5476 | −44.475 |
| 35 | 86.743 | 3.44 | 1.84666 | 23.8 | 27.69 | 0.6205 | 144.468 |
| 36 | 285.970 | 3.03 | | | 28.03 | | |
| 37 | ∞ | 16.48 | 1.62041 | 60.3 | 28.90 | 0.5426 | 171.230 |
| 38 | −106.653 | 6.47 | | | 31.93 | | |
| 39 | 162.243 | 7.42 | 1.48749 | 70.2 | 33.07 | 0.5300 | 67.989 |
| 40 | −41.203 | 0.20 | | | 33.14 | | |
| 41 | −86.425 | 1.60 | 1.88300 | 40.8 | 32.22 | 0.5667 | −35.445 |
| 42 | 49.948 | 9.05 | 1.48749 | 70.2 | 32.01 | 0.5300 | 51.511 |
| 43 | −47.820 | 0.20 | | | 32.49 | | |
| 44 | 247.432 | 9.09 | 1.56732 | 42.8 | 31.95 | 0.5730 | 41.084 |
| 45 | −25.544 | 1.60 | 1.88300 | 40.8 | 31.50 | 0.5667 | −36.359 |
| 46 | −125.843 | 0.20 | | | 32.36 | | |
| 47 | 66.747 | 7.59 | 1.48749 | 70.2 | 32.50 | 0.5300 | 61.021 |
| 48 | −51.977 | 14.00 | | | 32.08 | | |
| 49 | ∞ | 33.00 | 1.60859 | 46.4 | 60.00 | 0.5664 | ∞ |
| 50 | ∞ | 13.20 | 1.51633 | 64.2 | 60.00 | 0.5352 | ∞ |
| 51 | ∞ | | | | 60.00 | | |
| Image plane | ∞ | | | | | | |

Aspheric Coefficients

| | | | |
|---|---|---|---|
| R17 | K = −2.53234e+004 | A4 = −4.13015e−007 | A6 = −2.14627e−010 |
| | A8 = 2.26588e−013 | | |
| R19 | K = 5.22565e+003 | A4 = 8.81676e−008 | A6 = 1.58180e−012 |
| | A8 = 6.14872e−015 | | |
| R25 | K = −9.48244e+000 | A4 = −7.57187e−007 | A6 = −1.54476e−010 |
| | A8 = 2.42122e−014 | | |

Various Data

Zoom Ratio 100.00

| | Wide-Angle End | Middle Focal Length | Telephoto End |
|---|---|---|---|
| Focal Length | 9.30 | 351.12 | 930.00 |
| F-number | 1.85 | 1.85 | 4.90 |
| Angle of View | 30.60 | 0.90 | 0.34 |
| Image Height | 5.50 | 5.50 | 5.50 |
| Lens Total Length | 622.39 | 622.39 | 622.39 |
| BF | 12.00 | 12.00 | 12.00 |
| d10 | 3.07 | 167.22 | 176.64 |
| d17 | 266.10 | 45.13 | 1.96 |
| d26 | 3.00 | 59.82 | 93.57 |
| Entrance Pupil Position | 124.58 | 3013.28 | 11114.47 |
| Exit Pupil Position | 302.09 | 302.09 | 302.09 |
| Front Principal Point Position | 134.17 | 3789.40 | 15026.00 |
| Rear Principal Point Position | 2.70 | −339.12 | −918.00 |

Zoom Lens Unit Data

| Lens Unit | First Surface | Focal Length | Lens Configuration Length | Front Principal Point Position | Rear Principal Point Position |
|---|---|---|---|---|---|
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | 49.24 | 149.41 | 59.52 | 17.15 |

| | Wide-Angle End | Middle Focal Length | Telephoto End |
|---|---|---|---|
| β2 | −0.135 | −1.196 | −2.178 |
| β3 | −0.262 | −1.116 | −1.624 |
| β4 | 1.105 | 1.105 | 1.105 |

Example 2

| Surface No. | r | di | nd | vd | Effective Diameter | θgF | Focal Length |
|---|---|---|---|---|---|---|---|
| 1 | −9010.142 | 6.00 | 1.80440 | 39.6 | 196.06 | 0.5729 | −381.824 |
| 2 | 320.047 | 2.00 | | | 189.99 | | |
| 3 | 313.972 | 27.24 | 1.43387 | 95.1 | 191.42 | 0.5373 | 463.107 |
| 4 | −547.196 | 21.28 | | | 192.07 | | |
| 5 | 389.595 | 20.24 | 1.43387 | 95.1 | 195.91 | 0.5373 | 657.006 |
| 6 | −1055.459 | 0.25 | | | 195.61 | | |
| 7 | 302.197 | 19.44 | 1.43387 | 95.1 | 191.18 | 0.5373 | 656.096 |
| 8 | −5026.813 | 0.25 | | | 190.12 | | |
| 9 | 154.769 | 16.92 | 1.43875 | 95.0 | 175.10 | 0.5342 | 691.925 |
| 10 | 304.398 | Variable | | | 173.28 | | |
| 11 | 950.946 | 2.00 | 2.00330 | 28.3 | 39.36 | 0.5980 | −43.088 |
| 12 | 41.638 | 7.75 | | | 36.20 | | |
| 13 | −54.808 | 2.00 | 1.88300 | 40.8 | 36.26 | 0.5667 | −26.963 |
| 14 | 43.259 | 10.13 | 1.92286 | 18.9 | 40.12 | 0.6495 | 32.746 |
| 15 | −92.678 | 1.79 | | | 41.12 | | |
| 16 | −62.313 | 2.00 | 1.77250 | 49.6 | 41.27 | 0.5521 | −78.452 |
| 17* | 2714.516 | Variable | | | 43.70 | | |
| 18 | 125.712 | 11.25 | 1.56907 | 71.3 | 83.84 | 0.5451 | 212.853 |
| 19* | −3538.914 | 0.20 | | | 84.63 | | |
| 20 | 110.363 | 14.22 | 1.49700 | 81.5 | 87.82 | 0.5375 | 175.252 |
| 21 | −401.065 | 0.20 | | | 87.63 | | |
| 22 | 106.440 | 2.50 | 1.84666 | 23.8 | 85.13 | 0.6205 | −175.888 |
| 23 | 61.653 | 23.18 | 1.43875 | 95.0 | 80.71 | 0.5342 | 111.945 |
| 24 | −216.463 | 0.20 | | | 79.83 | | |
| 25* | 85.906 | 11.20 | 1.43875 | 95.0 | 74.90 | 0.5342 | 170.195 |
| 26 | −559.061 | Variable | | | 73.23 | | |
| 27 (Stop) | ∞ | 2.35 | | | 32.63 | | |
| 28 | −222.632 | 1.40 | 1.81600 | 46.6 | 31.19 | 0.5568 | −31.984 |
| 29 | 29.820 | 0.20 | | | 29.18 | | |
| 30 | 27.382 | 5.69 | 1.84666 | 23.8 | 29.37 | 0.6205 | 44.800 |
| 31 | 86.813 | 7.17 | | | 28.27 | | |
| 32 | −52.648 | 1.40 | 1.88300 | 40.8 | 26.06 | 0.5667 | −66.197 |
| 33 | −510.055 | 3.11 | | | 26.02 | | |
| 34 | −59.931 | 1.80 | 1.75500 | 52.3 | 25.90 | 0.5476 | −37.509 |
| 35 | 54.857 | 3.61 | 1.84666 | 23.8 | 26.64 | 0.6205 | 94.347 |
| 36 | 166.237 | 3.03 | | | 26.93 | | |
| 37 | ∞ | 16.06 | 1.62041 | 60.3 | 27.84 | 0.5426 | 172.035 |
| 38 | −107.155 | 5.63 | | | 31.15 | | |
| 39 | 138.882 | 7.19 | 1.48749 | 70.2 | 32.52 | 0.5300 | 66.785 |
| 40 | −41.988 | 0.20 | | | 32.64 | | |
| 41 | −106.918 | 1.60 | 1.88300 | 40.8 | 31.78 | 0.5667 | −32.013 |
| 42 | 39.004 | 10.02 | 1.48749 | 70.2 | 31.48 | 0.5300 | 42.100 |
| 43 | −39.946 | 0.20 | | | 32.07 | | |
| 44 | 551.503 | 8.85 | 1.56732 | 42.8 | 31.45 | 0.5730 | 40.405 |
| 45 | −23.915 | 1.60 | 1.88300 | 40.8 | 31.08 | 0.5667 | −33.009 |
| 46 | −133.862 | 0.20 | | | 32.23 | | |
| 47 | 68.903 | 7.90 | 1.48749 | 70.2 | 32.62 | 0.5300 | 55.431 |
| 48 | −43.023 | 14.00 | | | 32.41 | | |
| 49 | ∞ | 33.00 | 1.60859 | 46.4 | 60.00 | 0.5664 | ∞ |
| 50 | ∞ | 13.20 | 1.51633 | 64.2 | 60.00 | 0.5352 | ∞ |
| 51 | ∞ | | | | 60.00 | | |
| Image plane | ∞ | | | | | | |

Aspheric Coefficients

R17  K = −2.53234e+004   A4 = −2.44954e−007   A6 = −4.12901e−010
     A8 = 5.73716e−013
R19  K = 5.22565e+003    A4 = −2.85777e−009   A6 = 6.05544e−011
     A8 = 2.95783e−015
R25  K = 2.58811e−001    A4 = −9.51474e−007   A6 = −1.34383e−010
     A8 = 2.46604e−014

Various Data

Zoom Ratio    100.00

| | Wide-Angle End | Middle Focal Length | Telephoto End |
|---|---|---|---|
| Focal Length | 9.30 | 351.12 | 930.00 |
| F-Number | 1.85 | 1.85 | 4.90 |
| Angle of View | 30.60 | 0.90 | 0.34 |

-continued

| | | | |
|---|---|---|---|
| Image Height | 5.50 | 5.50 | 5.50 |
| Lens Total Length | 626.97 | 626.97 | 626.97 |
| BF | 11.99 | 11.99 | 11.99 |
| d10 | 5.22 | 171.28 | 180.92 |
| d17 | 255.10 | 42.07 | 5.00 |
| d26 | 3.00 | 49.97 | 77.40 |
| Entrance Pupil Position | 125.45 | 2886.76 | 9777.54 |
| Exit Pupil Position | 233.68 | 233.68 | 233.68 |
| Front Principal Point Position | 135.14 | 3794.02 | 14609.04 |
| Rear Principal Point Position | 2.69 | −339.13 | −918.01 |

Zoom Lens Unit Data

| Lens Unit | First Surface | Focal Length | Lens Configuration Length | Front Principal Point Position | Rear Principal Point Position |
|---|---|---|---|---|---|
| 1 | 1 | 237.31 | 113.61 | 64.18 | −17.84 |
| 2 | 11 | −22.00 | 25.68 | 4.94 | −11.81 |
| 3 | 18 | 60.00 | 62.95 | 20.09 | −27.48 |
| 4 | 27 | 44.21 | 149.41 | 56.44 | 29.64 |

| | Wide-Angle End | Middle Focal Length | Telephoto End |
|---|---|---|---|
| β2 | −0.117 | −1.035 | −1.895 |
| β3 | −0.238 | −1.021 | −1.479 |
| β4 | 1.399 | 1.399 | 1.399 |

Example 3

| Surface No. | r | di | nd | vd | Effective Diameter | θgF | Focal Length |
|---|---|---|---|---|---|---|---|
| 1 | 7000.000 | 6.00 | 1.83400 | 37.2 | 213.61 | 0.5775 | −449.052 |
| 2 | 357.503 | 2.00 | | | 205.79 | | |
| 3 | 357.503 | 29.40 | 1.43387 | 95.1 | 205.38 | 0.5373 | 485.048 |
| 4 | −501.918 | 22.37 | | | 204.27 | | |
| 5 | 336.083 | 17.77 | 1.43387 | 95.1 | 196.11 | 0.5373 | 776.526 |
| 6 | 66701.633 | 0.25 | | | 195.59 | | |
| 7 | 269.153 | 19.82 | 1.43387 | 95.1 | 191.51 | 0.5373 | 654.885 |
| 8 | 4775.593 | 0.25 | | | 190.29 | | |
| 9 | 180.677 | 15.41 | 1.43875 | 95.0 | 177.89 | 0.5342 | 786.874 |
| 10 | 368.154 | Variable | | | 175.98 | | |
| 11 | 2480.029 | 2.00 | 2.00330 | 28.3 | 45.42 | 0.5980 | −45.975 |
| 12 | 45.638 | 8.92 | | | 40.05 | | |
| 13 | −56.112 | 2.00 | 1.88300 | 40.8 | 39.59 | 0.5667 | −35.474 |
| 14 | 73.053 | 8.84 | 1.94595 | 18.0 | 40.61 | 0.6545 | 37.281 |
| 15 | −65.772 | 0.60 | | | 41.51 | | |
| 16 | −65.663 | 2.00 | 1.88300 | 40.8 | 41.54 | 0.5667 | −72.711 |
| 17* | 3965.269 | Variable | | | 43.32 | | |
| 18 | 99.671 | 14.10 | 1.56907 | 71.3 | 85.55 | 0.5451 | 170.117 |
| 19* | −3619.474 | 0.20 | | | 85.60 | | |
| 20 | 96.176 | 13.65 | 1.49700 | 81.5 | 85.93 | 0.5375 | 193.636 |
| 21 | 25787.680 | 0.20 | | | 84.86 | | |
| 22 | 422.158 | 2.50 | 1.84666 | 23.8 | 83.83 | 0.6205 | −183.820 |
| 23 | 114.219 | 18.45 | 1.43875 | 95.0 | 81.17 | 0.5342 | 147.386 |
| 24 | −142.520 | 0.20 | | | 80.02 | | |
| 25* | 217.708 | 4.93 | 1.43875 | 95.0 | 75.65 | 0.5342 | 469.490 |
| 26 | −3985.731 | Variable | | | 74.31 | | |
| 27 (Stop) | ∞ | 8.52 | | | 36.54 | | |
| 28 | −567.828 | 1.40 | 1.81600 | 46.6 | 31.98 | 0.5568 | −36.016 |
| 29 | 31.195 | 0.20 | | | 30.48 | | |
| 30 | 27.263 | 6.22 | 1.84666 | 23.8 | 30.96 | 0.6205 | 41.868 |
| 31 | 102.304 | 6.91 | | | 29.97 | | |
| 32 | −60.794 | 1.40 | 1.88300 | 40.8 | 27.95 | 0.5667 | −980.787 |
| 33 | −66.064 | 2.37 | | | 27.92 | | |
| 34 | −45.875 | 1.80 | 1.75500 | 52.3 | 27.12 | 0.5476 | −62.063 |

-continued

| | | | | | | | |
|---|---|---|---|---|---|---|---|
| 35 | −1836.601 | 1.22 | 1.84666 | 23.8 | 27.24 | 0.6205 | −99.966 |
| 36 | 89.675 | 3.03 | | | 27.31 | | |
| 37 | ∞ | 14.90 | 1.62041 | 60.3 | 27.96 | 0.5426 | 2371.111 |
| 38 | −1476.882 | 5.50 | | | 30.92 | | |
| 39 | 87.779 | 7.61 | 1.48749 | 70.2 | 33.16 | 0.5300 | 64.850 |
| 40 | −48.256 | 0.20 | | | 33.40 | | |
| 41 | −113.704 | 1.60 | 1.88300 | 40.8 | 32.90 | 0.5667 | −50.945 |
| 42 | 75.650 | 8.54 | 1.48749 | 70.2 | 32.93 | 0.5300 | 59.272 |
| 43 | −45.265 | 0.20 | | | 33.39 | | |
| 44 | 242.283 | 8.95 | 1.56732 | 42.8 | 32.61 | 0.5730 | 44.297 |
| 45 | −27.834 | 1.60 | 1.88300 | 40.8 | 32.03 | 0.5667 | −41.331 |
| 46 | −118.251 | 0.20 | | | 32.56 | | |
| 47 | 59.750 | 6.83 | 1.48749 | 70.2 | 32.32 | 0.5300 | 71.520 |
| 48 | −81.233 | 14.00 | | | 31.62 | | |
| 49 | ∞ | 33.00 | 1.60859 | 46.4 | 60.00 | 0.5664 | ∞ |
| 50 | ∞ | 13.20 | 1.51633 | 64.2 | 60.00 | 0.5352 | ∞ |
| 51 | ∞ | Variable | | | 60.00 | | |
| Image plane | ∞ | | | | | | |

Aspheric Coefficients

| | | | |
|---|---|---|---|
| R17 | K = −2.53234e+004 | A4 = −3.38222e−007 | A6 = −1.13320e−010 |
| | A8 = 1.04282e−013 | | |
| R19 | K = 5.22565e+003 | A4 = 1.38826e−007 | A6 = −2.25608e−011 |
| | A8 = 7.05801e−015 | | |
| R25 | K = −3.20598e+000 | A4 = −7.86592e−007 | A6 = −1.94993e−010 |
| | A8 = 1.40774e−014 | | |

Various Data

| Zoom Ratio | 120.00 | | | | |
|---|---|---|---|---|---|
| Focal Length | 9.00 | 27.72 | 71.12 | 356.79 | 1080.00 |
| F-Number | 1.85 | 1.85 | 1.85 | 1.85 | 5.60 |
| Angle of View | 31.43 | 11.22 | 4.42 | 0.88 | 0.29 |
| Image height | 5.50 | 5.50 | 5.50 | 5.50 | 5.50 |
| Lens Total Length | 657.18 | 657.18 | 657.18 | 657.18 | 657.18 |
| BF | 12.00 | 12.00 | 12.00 | 12.00 | 12.00 |
| d10 | 3.13 | 97.13 | 141.13 | 177.16 | 187.42 |
| d17 | 297.77 | 191.44 | 132.73 | 57.35 | 2.03 |
| d26 | 3.00 | 15.34 | 30.04 | 69.40 | 114.46 |
| d51 | 12.00 | 12.00 | 12.00 | 12.00 | 12.00 |
| Entrance Pupil Position | 128.68 | 416.07 | 873.88 | 3239.97 | 14318.57 |
| Exit Pupil Position | 306.94 | 306.94 | 306.94 | 306.94 | 306.94 |
| Front Principal Point Position | 137.95 | 446.40 | 962.14 | 4028.36 | 19353.29 |
| Rear Principal Point Position | 3.00 | −15.72 | −59.12 | −344.78 | −1068.00 |

Zoom Lens Unit Data

| Lens Unit | First Surface | Focal Length | Lens Configuration Length | Front Principal Point Position | Rear Principal Point Position |
|---|---|---|---|---|---|
| 1 | 1 | 248.58 | 113.27 | 62.46 | −20.56 |
| 2 | 11 | −26.00 | 24.36 | 4.30 | −12.13 |
| 3 | 18 | 76.00 | 54.23 | 13.84 | −25.71 |
| 4 | 27 | 54.93 | 149.41 | 67.47 | 11.36 |

| | Wide-Angle End | Middle Focal Length | Telephoto End |
|---|---|---|---|
| β2 | −0.134 | −1.265 | −2.525 |
| β3 | −0.274 | −1.148 | −1.741 |
| β4 | 0.988 | 0.988 | 0.988 |

Example 4

| Surface No. | r | di | nd | vd | Effective Diameter | θgF | Focal Length |
|---|---|---|---|---|---|---|---|
| 1 | 2129.395 | 6.00 | 1.80100 | 35.0 | 208.05 | 0.5863 | −510.719 |
| 2 | 344.673 | 2.00 | | | 201.11 | | |
| 3 | 346.355 | 24.55 | 1.43387 | 95.1 | 200.92 | 0.5373 | 567.183 |
| 4 | −839.014 | 22.52 | | | 200.00 | | |
| 5 | 389.319 | 17.75 | 1.43387 | 95.1 | 195.27 | 0.5373 | 763.997 |
| 6 | −2237.919 | 0.25 | | | 194.86 | | |
| 7 | 279.897 | 19.03 | 1.43387 | 95.1 | 190.65 | 0.5373 | 673.481 |
| 8 | 6158.046 | 0.25 | | | 189.53 | | |
| 9 | 176.118 | 16.13 | 1.43875 | 95.0 | 177.22 | 0.5342 | 727.500 |
| 10 | 380.747 | Variable | | | 175.48 | | |
| 11 | 2885.419 | 2.00 | 2.00330 | 28.3 | 44.90 | 0.5980 | −44.351 |
| 12 | 44.167 | 9.11 | | | 39.53 | | |
| 13 | −52.012 | 2.00 | 1.88300 | 40.8 | 39.14 | 0.5667 | −37.776 |
| 14 | 96.232 | 8.35 | 1.94087 | 17.4 | 40.47 | 0.6775 | 41.405 |
| 15 | −64.098 | 0.09 | | | 41.55 | | |
| 16 | −74.481 | 2.00 | 1.88300 | 40.8 | 41.62 | 0.5667 | −82.049 |
| 17* | 3416.072 | Variable | | | 43.27 | | |
| 18 | 102.087 | 13.85 | 1.56907 | 71.3 | 85.54 | 0.5451 | 174.085 |
| 19* | −3588.372 | 0.20 | | | 85.63 | | |
| 20 | 96.561 | 13.70 | 1.49700 | 81.5 | 86.02 | 0.5375 | 188.659 |
| 21 | −3428.446 | 0.20 | | | 85.03 | | |
| 22 | 348.188 | 2.50 | 1.84666 | 23.8 | 83.63 | 0.6205 | −184.503 |
| 23 | 108.208 | 17.89 | 1.43875 | 95.0 | 80.81 | 0.5342 | 150.213 |
| 24 | −161.104 | 0.20 | | | 79.59 | | |
| 25* | 211.496 | 5.03 | 1.43875 | 95.0 | 75.67 | 0.5342 | 456.936 |
| 26 | −4014.724 | Variable | | | 74.34 | | |
| 27 (Stop) | ∞ | 5.61 | | | 36.63 | | |
| 28 | −1845.052 | 1.40 | 1.81600 | 46.6 | 33.59 | 0.5568 | −37.314 |
| 29 | 31.130 | 0.20 | | | 31.91 | | |
| 30 | 27.954 | 6.43 | 1.84666 | 23.8 | 32.38 | 0.6205 | 42.504 |
| 31 | 108.263 | 7.45 | | | 31.42 | | |
| 32 | −55.071 | 1.40 | 1.88300 | 40.8 | 29.28 | 0.5667 | −64.753 |
| 33 | −1313.708 | 2.01 | | | 29.33 | | |
| 34 | −2773.834 | 1.80 | 1.62041 | 60.3 | 29.34 | 0.5426 | 237.258 |
| 35 | −140.340 | 1.56 | 1.84666 | 23.8 | 29.35 | 0.6205 | −136.438 |
| 36 | 694.948 | 3.03 | | | 29.44 | | |
| 37 | ∞ | 14.07 | 1.62041 | 60.3 | 29.72 | 0.5426 | −203.170 |
| 38 | 126.547 | 8.31 | | | 30.63 | | |
| 39 | 108.195 | 6.72 | 1.48749 | 70.2 | 32.82 | 0.5300 | 80.690 |
| 40 | −60.869 | 0.20 | | | 33.03 | | |
| 41 | −138.367 | 1.60 | 1.88300 | 40.8 | 32.76 | 0.5667 | −58.384 |
| 42 | 83.385 | 8.95 | 1.48749 | 70.2 | 32.84 | 0.5300 | 59.692 |
| 43 | −43.348 | 0.20 | | | 33.36 | | |
| 44 | 504.860 | 8.59 | 1.56732 | 42.8 | 32.55 | 0.5730 | 45.993 |
| 45 | −27.505 | 1.60 | 1.88300 | 40.8 | 32.04 | 0.5667 | −40.719 |
| 46 | −118.009 | 0.20 | | | 32.66 | | |
| 47 | 57.454 | 7.89 | 1.48749 | 70.2 | 32.51 | 0.5300 | 68.366 |
| 48 | −76.402 | 14.00 | | | 31.66 | | |
| 49 | ∞ | 33.00 | 1.60859 | 46.4 | 60.00 | 0.5664 | ∞ |
| 50 | ∞ | 13.20 | 1.51633 | 64.2 | 60.00 | 0.5352 | ∞ |
| 51 | ∞ | | | | 60.00 | | |
| Image plane | ∞ | | | | | | |

Aspheric Coefficients

R17  K = −2.53234e+004  A4 = −3.62355e−007  A6 = −2.14731e−010
     A8 = 1.63676e−013

R19  K = 5.22565e+003  A4 = 1.08856e−007  A6 = −2.48018e−011
     A8 = 7.66860e−015

R25  K = −5.70319e+000  A4 = −7.40368e−007  A6 = −2.01733e−010
     A8 = 1.95906e−014

Various Data

| Zoom Ratio | 120.00 | | |
|---|---|---|---|
| | Wide-Angle End | Middle Focal Length | Telephoto End |
| Focal Length | 9.00 | 356.79 | 1080.00 |
| F-Number | 1.85 | 1.85 | 5.60 |
| Angle of View | 31.43 | 0.88 | 0.29 |

-continued

| | | | |
|---|---|---|---|
| Image Height | 5.50 | 5.50 | 5.50 |
| Lens Total Length | 650.52 | 650.52 | 650.52 |
| BF | 12.00 | 12.00 | 12.00 |
| d10 | 2.44 | 176.47 | 186.72 |
| d17 | 298.07 | 57.64 | 2.33 |
| d26 | 3.00 | 69.40 | 114.46 |
| Entrance Pupil Position | 125.17 | 3230.23 | 14257.94 |
| Exit Pupil Position | 399.29 | 399.29 | 399.29 |
| Front Principal Point Position | 134.38 | 3915.70 | 18349.64 |
| Rear Principal Point Position | 3.00 | −344.79 | −1068.00 |

Zoom Lens Unit Data

| Lens Unit | First Surface | Focal Length | Lens Configuration Length | Front Principal Point Position | Rear Principal Point Position |
|---|---|---|---|---|---|
| 1 | 1 | 248.58 | 108.48 | 58.95 | −21.72 |
| 2 | 11 | −26.00 | 23.55 | 3.84 | −12.32 |
| 3 | 18 | 76.00 | 53.58 | 13.36 | −25.49 |
| 4 | 27 | 57.62 | 149.40 | 67.66 | 11.33 |

| | Wide-Angle End | Middle Focal Length | Telephoto End |
|---|---|---|---|
| β2 | −0.134 | −1.265 | −2.525 |
| β3 | −0.274 | −1.148 | −1.741 |
| β4 | 0.988 | 0.988 | 0.988 |

Example 5

| Surface No. | r | di | nd | vd | Effective Diameter | θgF | Focal Length |
|---|---|---|---|---|---|---|---|
| 1 | 7896.929 | 6.00 | 1.83400 | 37.2 | 211.49 | 0.5775 | −433.905 |
| 2 | 348.011 | 2.00 | | | 203.64 | | |
| 3 | 345.504 | 26.03 | 1.43387 | 95.1 | 203.24 | 0.5373 | 546.674 |
| 4 | −745.232 | 24.47 | | | 202.29 | | |
| 5 | 388.160 | 22.54 | 1.43387 | 95.1 | 198.87 | 0.5373 | 599.263 |
| 6 | −779.545 | 0.25 | | | 198.57 | | |
| 7 | 268.723 | 17.78 | 1.43387 | 95.1 | 192.50 | 0.5373 | 749.091 |
| 8 | 1502.611 | 0.25 | | | 191.30 | | |
| 9 | 176.058 | 15.43 | 1.43875 | 95.0 | 179.79 | 0.5342 | 794.518 |
| 10 | 345.300 | Variable | | | 178.06 | | |
| 11 | 920.754 | 2.00 | 2.00330 | 28.3 | 45.44 | 0.5980 | −47.720 |
| 12 | 45.823 | 6.33 | | | 40.18 | | |
| 13 | −208.974 | 2.00 | 1.88300 | 40.8 | 39.67 | 0.5667 | −30.818 |
| 14 | 31.638 | 9.55 | 1.94595 | 18.0 | 39.21 | 0.6545 | 32.155 |
| 15 | −1005.578 | 3.73 | | | 39.39 | | |
| 16 | −60.285 | 2.00 | 1.88300 | 40.8 | 39.45 | 0.5667 | −65.865 |
| 17* | 2003.823 | Variable | | | 41.47 | | |
| 18 | 239.266 | 8.90 | 1.56907 | 71.3 | 82.57 | 0.5451 | 399.670 |
| 19* | −4869.111 | 0.20 | | | 83.93 | | |
| 20 | 99.548 | 15.43 | 1.49700 | 81.5 | 88.86 | 0.5375 | 167.337 |
| 21 | −487.999 | 0.20 | | | 88.65 | | |
| 22 | 73.800 | 2.50 | 1.84666 | 23.8 | 85.52 | 0.6205 | −192.435 |
| 23 | 50.153 | 24.02 | 1.43875 | 95.0 | 79.45 | 0.5342 | 114.284 |
| 24 | 18699.561 | 0.20 | | | 78.09 | | |
| 25* | 79.222 | 10.87 | 1.43875 | 95.0 | 74.99 | 0.5342 | 170.487 |
| 26 | −1344.599 | Variable | | | 73.35 | | |
| 27 (Stop) | ∞ | 2.95 | | | 33.36 | | |
| 28 | −116.136 | 1.40 | 1.81600 | 46.6 | 32.00 | 0.5568 | −33.538 |
| 29 | 36.240 | 0.20 | | | 30.54 | | |
| 30 | 32.317 | 5.69 | 1.84666 | 23.8 | 30.77 | 0.6205 | 47.626 |
| 31 | 143.868 | 6.74 | | | 29.92 | | |
| 32 | −56.964 | 1.40 | 1.88300 | 40.8 | 28.11 | 0.5667 | −102.268 |
| 33 | −154.548 | 2.77 | | | 28.16 | | |
| 34 | −64.023 | 1.80 | 1.75500 | 52.3 | 27.93 | 0.5476 | −62.225 |

-continued

| | | | | | | | |
|---|---|---|---|---|---|---|---|
| 35 | 181.715 | 3.38 | 1.84666 | 23.8 | 28.42 | 0.6205 | 139.976 |
| 36 | −347.608 | 3.03 | | | 28.69 | | |
| 37 | ∞ | 15.01 | 1.62041 | 60.3 | 29.13 | 0.5426 | −173.397 |
| 38 | 108.003 | 6.44 | | | 30.43 | | |
| 39 | 380.578 | 7.18 | 1.48749 | 70.2 | 32.23 | 0.5300 | 69.036 |
| 40 | −36.827 | 0.20 | | | 32.77 | | |
| 41 | −157.843 | 1.60 | 1.88300 | 40.8 | 32.07 | 0.5667 | −38.927 |
| 42 | 44.480 | 10.13 | 1.48749 | 70.2 | 31.97 | 0.5300 | 43.191 |
| 43 | −37.230 | 0.20 | | | 32.61 | | |
| 44 | 283.380 | 8.80 | 1.56732 | 42.8 | 31.74 | 0.5730 | 41.513 |
| 45 | −25.550 | 1.60 | 1.88300 | 40.8 | 31.24 | 0.5667 | −32.251 |
| 46 | −243.484 | 0.20 | | | 32.03 | | |
| 47 | 54.265 | 8.00 | 1.48749 | 70.2 | 32.41 | 0.5300 | 54.763 |
| 48 | −50.339 | 14.00 | | | 32.04 | | |
| 49 | ∞ | 33.00 | 1.60859 | 46.4 | 60.00 | 0.5664 | ∞ |
| 50 | ∞ | 13.20 | 1.51633 | 64.2 | 60.00 | 0.5352 | ∞ |
| 51 | ∞ | | | | 60.00 | | |
| Image plane | ∞ | | | | | | |

Aspheric Coefficients

R17  K = −2.53234e+004    A4 = 1.87157e−007    A6 = −7.67739e−010
     A8 = 9.41364e−013
R19  K = 5.22565e+003     A4 = −4.49518e−007   A6 = 1.26923e−010
     A8 = −1.31489e−014
R25  K = −2.03560e+000    A4 = −8.64535e−007   A6 = 4.49347e−011
     A8 = 1.82895e−014

Various Data

| Zoom Ratio | | 120.00 | |
|---|---|---|---|
| | Wide-Angle End | Middle Focal Length | Telephoto End |
| Focal Length | 9.00 | 356.79 | 1080.00 |
| F-number | 1.85 | 1.85 | 5.60 |
| angle of View | 31.43 | 0.88 | 0.29 |
| Image Height | 5.50 | 5.50 | 5.50 |
| Lens Total Length | 652.55 | 652.55 | 652.55 |
| BF | 12.00 | 12.00 | 12.00 |
| d10 | 3.58 | 184.07 | 195.16 |
| d17 | 282.38 | 50.80 | 4.99 |
| d26 | 3.00 | 54.08 | 88.81 |
| Entrance Pupil Position | 128.73 | 3118.89 | 12946.69 |
| Exit Pupil Position | 311.33 | 311.33 | 311.33 |
| Front Principal Point Position | 138.00 | 3900.95 | 17923.40 |
| Rear Principal Point Position | 3.00 | −344.78 | −1068.00 |

Zoom Lens Unit Data

| Lens Unit | First Surface | Focal Length | Lens Configuration Length | Front Principal Point Position | Rear Principal Point Position |
|---|---|---|---|---|---|
| 1 | 1 | 254.33 | 114.73 | 66.36 | −17.68 |
| 2 | 11 | −23.50 | 25.61 | 6.74 | −9.36 |
| 3 | 18 | 64.25 | 62.32 | 18.15 | −27.58 |
| 4 | 27 | 49.61 | 148.93 | 60.07 | 26.51 |

| | Wide-Angle End | Middle Focal Length | Telephoto End |
|---|---|---|---|
| β2 | −0.116 | −1.052 | −2.090 |
| β3 | −0.236 | −1.031 | −1.572 |
| β4 | 1.292 | 1.292 | 1.292 |

TABLE 1

| Condition | Example | | | | |
|---|---|---|---|---|---|
| | 1 | 2 | 3 | 4 | 5 |
| (1) | $-3.74 \times 10^{-3}$ | $-3.74 \times 10^{-3}$ | $-4.16 \times 10^{-3}$ | $-5.23 \times 10^{-3}$ | $-4.15 \times 10^{-3}$ |
| (2) | $-5.48 \times 10^{-3}$ | $-5.48 \times 10^{-3}$ | $-5.49 \times 10^{-3}$ | $-7.29 \times 10^{-3}$ | $-4.15 \times 10^{-3}$ |
| (3) | $-0.793$ | $-0.846$ | $-0.791$ | $-0.824$ | $-0.817$ |
| (4) | $-0.696$ | $-0.672$ | $-0.697$ | $-0.627$ | $-0.731$ |
| (5) | 1.658 | 1.607 | 1.656 | 1.591 | 1.612 |
| (6) | 9.522 | 10.787 | 9.561 | 9.561 | 10.823 |
| (7) | 3.907 | 3.919 | 4.344 | 4.344 | 4.246 |
| (8) | 25.597 | 25.517 | 27.620 | 27.620 | 28.250 |

With the above-described configuration, each exemplary embodiment of the present invention can implement a zoom lens having a high zoom ratio, capable of effectively correcting chromatic aberration in the entire zoom range from the wide-angle end to the telephoto end, and having a high optical performance in the entire zoom range, and an image pickup apparatus having the zoom lens.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-261593 filed Oct. 8, 2008, which is hereby incorporated by reference herein in its entirety.

What is claimed is:

1. A zoom lens comprising, in order from an object side to an image side:
    a first lens unit having a positive refractive power;
    a second lens unit having a negative refractive power and configured to move during zooming;
    a third lens unit having a positive refractive power and configured to move during zooming; and
    a fourth lens unit having a positive refractive power and configured not to move for zooming,
    wherein the second lens unit includes at least one positive lens and at least one negative lens, and
    wherein average values of Abbe number (v) and relative partial dispersion (θ) of materials of the at least one negative lens (vna, θna) and average values of Abbe number (v) and relative partial dispersion (θ) of materials of the at least one positive lens (vpa, θpa) satisfy the following condition:

$(\theta pa - \theta na)/(\nu pa - \nu na) < -3.7 \times 10^{-3}$.

2. The zoom lens according to claim 1, wherein a focal length of a negative lens, of the lenses included in the second lens unit, made of a material whose Abbe number is the smallest of Abbe numbers of the lenses included in the second lens unit and an Abbe number and a relative partial dispersion of the material of the negative lens (f2n, vn, θn), and a focal length of a positive lens, of the lenses included in the second lens unit, made of a material whose Abbe number is the greatest of Abbe numbers of the lenses included in the second lens unit and an Abbe number and a relative partial dispersion of the material of the positive lens (f2p, vp, θp) satisfy the following conditions:

$(\theta p - \theta n)/(\nu p - \nu n) < -5.0 \times 10^{-3}$ $-2.0 < (1/f2)/(1/f2p - 1/f2n) < -0.2$.

3. The zoom lens according to claim 1, wherein a total value of refractive powers of positive lenses included in the second lens unit (φp), a total value of refractive powers of negative lenses included in the second lens unit (φn), and a refractive power of the second lens unit (φ2) satisfy the following conditions:

$\phi p/\phi 2 < -0.5$ $\phi n/\phi 2 > 1.5$.

4. The zoom lens according to claim 1, wherein the second lens unit includes, in order from the object side to the image side:
    a negative lens having a meniscus shape whose surface on the object side has a convex shape;
    a negative lens both of whose surfaces have a concave shape;
    a positive lens both of whose surfaces have a convex shape; and
    a negative lens whose surface on the object side has a concave shape.

5. The zoom lens according to claim 1, wherein a focal length of the first lens unit (f1) and a focal length of the second lens unit (f2) satisfy the following condition:

$9.5 < |f1/f2| < 11.0$.

6. The zoom lens according to claim 1, wherein a focal length of the first lens unit (f1) and a focal length of the zoom lens at a telephoto end (ftele) satisfy the following condition:

$3.9 < ftele/f1 < 6.0$.

7. The zoom lens according to claim 1, wherein a focal length of the first lens unit (f1) and a focal length of the zoom lens at a wide-angle end (fwide) satisfy the following condition:

$25 < f1/fwide < 30$.

8. The zoom lens according to claim 1, wherein the second lens unit includes, in order from the object side to the image side:
    a negative lens whose surface on the image side has a concave shape;
    a cemented lens including a negative lens both of whose surfaces have a concave shape and a positive lens both of whose surfaces have a convex shape; and
    a negative lens whose surface on the object side has a concave shape.

9. An image pickup apparatus comprising:
    an image sensor; and
    a zoom lens configured to guide light from an object to the image sensor, wherein the zoom lens includes, in order from the object side to the image sensor side:
a first lens unit having a positive refractive power;
a second lens unit having a negative refractive power and configured to move during zooming;
a third lens unit having a positive refractive power and configured to move during zooming; and
a fourth lens unit having a positive refractive power and configured not to move for zooming,
wherein the second lens unit includes at least one positive lens and at least one negative lens, and
wherein average values of Abbe number ($\nu$) and relative partial dispersion ($\theta$) of materials of the at least one negative lens ($\nu na$, $\theta na$) and average values of Abbe number ($\nu$) and relative partial dispersion ($\theta$) of materials of the at least one positive lens ($\nu pa$, $\theta pa$) satisfy the following condition:

$$(\theta pa - \theta na)/(\nu pa - \nu na) < -3.7 \times 10^{-3}.$$

* * * * *